United States Patent
Tripathi et al.

(10) Patent No.: US 9,456,426 B2
(45) Date of Patent: Sep. 27, 2016

(54) DETERMINING A GAIN FACTOR FOR TRANSMIT POWER CONTROL IN ENHANCED UPLINK

(71) Applicant: QUALCOMM Incorporated, San Diego, CA (US)

(72) Inventors: Ambarish Tripathi, San Diego, CA (US); Vaishakh Rao, San Diego, CA (US); Yi Zhang, San Diego, CA (US); Liangchi Hsu, San Diego, CA (US); Zae Yong Choi, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 14/286,772

(22) Filed: May 23, 2014

(65) Prior Publication Data

US 2015/0163755 A1    Jun. 11, 2015

Related U.S. Application Data

(60) Provisional application No. 61/913,136, filed on Dec. 6, 2013.

(51) Int. Cl.
*H04B 7/185* (2006.01)
*H04W 4/00* (2009.01)
(Continued)

(52) U.S. Cl.
CPC ........... *H04W 52/367* (2013.01); *H04W 52/16* (2013.01); *H04W 52/267* (2013.01); *H04W 52/286* (2013.01)

(58) Field of Classification Search
CPC . H04W 52/16; H04W 52/36; H04W 52/267; H04W 52/283; H04W 52/286; H04W 52/325; H04W 52/367; H04W 52/04; H04W 52/08; H04W 52/34; H04W 52/146; H04W 52/346; H04B 7/0413; H04B 7/0426; H04B 7/0465
USPC ........ 370/252, 254–258, 310–350, 431–444, 370/464–486; 455/13.4, 450–464, 522
See application file for complete search history.

(56) References Cited

U.S. PATENT DOCUMENTS 8,358,614 B2 *   1/2013  Pani ..................... H04W 52/346
                                                          370/310.2
8,554,257 B2    10/2013  Hannu et al.
(Continued)

OTHER PUBLICATIONS

International Search Report and Written Opinion—PCT/US2014/068936—ISA/EPO—Mar. 12, 2015.

*Primary Examiner* — Tri H Phan
(74) *Attorney, Agent, or Firm* — Loza & Loza LLP

(57) ABSTRACT

A gain factor is used for calculating one transmit power relative to another transmit power. For example, in UMTS high speed uplink packet access, a gain factor called βed is employed for transmission associated a given enhanced transport format combination indicator (E-TFCI). Conventionally, a gain factor to be used for a given E-TFCI can be determined via interpolation between two of the reference E-TFCIs to reduce signaling overhead. However, certain network configurations may result in one or more of the reference E-TFCIs that could be otherwise be used according to conventional techniques being outside of a valid range. In the event such a sub-optimal configuration occurs, interpolation and/or extrapolation schemes based on at least one reference E-TFCIs that is within and/or or is not within the valid range are used to calculate a gain factor for a given E-TFCI.

15 Claims, 20 Drawing Sheets

(51) Int. Cl.
*H04W 52/36* (2009.01)
*H04W 52/16* (2009.01)
*H04W 52/26* (2009.01)
*H04W 52/28* (2009.01)

(56) References Cited

U.S. PATENT DOCUMENTS

| | | | | |
|---|---|---|---|---|
| 8,571,488 B2* | 10/2013 | Cai | ...................... | H04B 7/0404 455/101 |
| 8,606,283 B2* | 12/2013 | Hu | ........................ | H04W 52/50 455/450 |
| 8,868,121 B2* | 10/2014 | Ventola | ............... | H04W 52/146 370/318 |
| 8,885,611 B2* | 11/2014 | Mella | .................. | H04W 52/146 370/332 |
| 8,929,475 B2* | 1/2015 | Akkarakaran | ....... | H04B 7/0404 375/267 |
| 9,031,600 B2* | 5/2015 | Pelletier | .............. | H04W 52/367 455/127.1 |
| 9,049,700 B2* | 6/2015 | Marinier | ............. | H04W 52/346 |
| 9,055,604 B2* | 6/2015 | Zhang | .................... | H04W 52/12 |
| 9,060,339 B2* | 6/2015 | Yang | .................... | H04W 36/385 |
| 9,185,660 B2* | 11/2015 | Weng | .................. | H04W 52/241 |
| 2007/0211684 A1* | 9/2007 | Lee | ........................ | H04W 52/08 370/342 |
| 2010/0041427 A1* | 2/2010 | Hannu | .................. | H04W 52/16 455/522 |
| 2011/0110244 A1* | 5/2011 | Lin | ....................... | H04L 1/1692 370/252 |
| 2011/0190023 A1 | 8/2011 | Hannu et al. | | |
| 2012/0177089 A1 | 7/2012 | Pelletier et al. | | |
| 2012/0275403 A1 | 11/2012 | Zhang et al. | | |
| 2013/0021934 A1* | 1/2013 | Rugamer | ................ | G01S 19/13 370/252 |
| 2013/0023300 A1 | 1/2013 | Tani et al. | | |
| 2013/0201940 A1* | 8/2013 | Zhang | ................ | H04W 52/12 370/329 |
| 2014/0010198 A1 | 1/2014 | Wang et al. | | |
| 2014/0092858 A1* | 4/2014 | Zhang | ................ | H04W 52/286 370/329 |

\* cited by examiner

DETERMINING A GAIN FACTOR FOR TRANSMIT POWER CONTROL IN ENHANCED UPLINK

CROSS-REFERENCE TO RELATED APPLICATION

This application claims priority to and the benefit of provisional patent application No. 61/913,136 filed in the U.S. patent office on Dec. 6, 2013, the entire content of which is incorporated herein by reference.

TECHNICAL FIELD

Aspects of the present disclosure relate generally to wireless communication, and more particularly, but not exclusively, to determining a gain factor for transmit power control.

BACKGROUND

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

Some types of wireless communication networks employ relative power control. For example, the transmit power for a data channel may be determined as an offset from the transmit power for a control channel. This offset is referred to as a gain factor in some wireless technologies. In general, it is desirable to select gain factor values that result in efficient utilization of network resources. However, different gains factors may be used depending on the particular channel configuration in use. As channel configurations may change dynamically, gain factors may be determined on a dynamic basis. Thus, there is a need for improved techniques for determining gain factors in wireless communication networks.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for determining a gain factor. In some networks, a gain factor is used for calculating one transmit power relative to another transmit power. For example, in UMTS high speed uplink packet access (HSUPA), transmission of a given enhanced transport format combination (E-TFC) employs a gain factor called βed. In some aspects, the gain factor βed specifies an offset between the transmit power for a control channel and a transmit power used for transmitting an E-TFC over a data channel. For purposes of reference, each E-TFC is identified by a corresponding E-TFC indicator (E-TFCI).

To reduce signaling overhead, a network might not send the mapping between all possible E-TFCIs (i.e., all possible E-TFCs) and all corresponding gain factors to the UEs in the network. Instead, the network may send to the UEs the mapping for a smaller number of reference E-TFCIs. The gain factor to be used for a given E-TFCI according to conventional techniques is thus determined via interpolation between two of the reference E-TFCIs or via extrapolation based on a single reference E-TFCI.

In practice, certain network configurations may result in one or more of the reference E-TFCIs being outside of a valid range. For example, depending on the currently specified spreading factor, a UE might not be able to use one or more of the reference E-TFCIs associated with "higher" E-TFCs. In general, a "higher" E-TFC (and, hence, a "higher" E-TFCI) corresponds to a higher transmission rate (e.g., used to send a larger combination of transport formats specified by the "higher" E-TFC). In such a case, network performance may suffer if the gain factor is calculated (e.g., by interpolation) using less than optimal reference E-TFCIs. For example, a channel may experience a relatively high error rate if the gain factor specified for the channel is too low.

In the event such a sub-optimal configuration occurs, the techniques described herein can be used to calculate a gain factor for a particular E-TFCI. Advantageously, these techniques can provide a better gain factor for the E-TFCI as compared to conventional gain factor generation techniques.

In a first technique (e.g., a first option), the gain factor for an E-TFCI is calculated based on an interpolation formula. This formula interpolates between a reference power offset for a reference E-TFCI that is within the valid range and a reference power offset for a reference E-TFCI that is not within the valid range to provide a gain factor value for the E-TFCI of interest. Thus, even though one of the reference E-TFCIs is not in the valid range, it is still used for the interpolation.

In a second technique, the gain factor for an E-TFCI is calculated based on an interpolation formula that uses reference power offsets for the two highest reference E-TFCIs within the valid range. In this case, although the E-TFCI of interest might not lie between the two reference E-TFCIs, the gain factors for the E-TFCI of interest can still be calculated using E-TFCIs within the valid range.

In a third technique, the gain factor for an E-TFCI is calculated based on an extrapolation formula. This formula uses a reference power offset for the highest reference E-TFCI within the valid range to extrapolate a gain factor value for the E-TFCI of interest.

A fourth technique involves both extrapolation and interpolation. Initially, a first gain factor for a maximum allowed E-TFCI is extrapolated based on the reference power offset of the highest reference E-TFCI within the valid range. The maximum E-TFCI that is allowed may depend on the current network configuration. A gain factor for an E-TFCI of interest is then interpolated from the first gain factor and the reference power offset of the highest reference E-TFCI within the valid range.

In one aspect, the disclosure provides a method for wireless communication including determining that a first enhanced transport format combination indicator (E-TFCI) for high speed uplink packet access (HSUPA) is outside of a valid range of reference E-TFCIs; identifying a highest reference E-TFCI within the valid range; determining a gain factor for the first E-TFCI based on the highest reference E-TFCI within the valid range; and transmitting a signal at a power level that is based on the gain factor.

Another aspect of the disclosure provides an apparatus configured for wireless communication. The apparatus including means for determining that a first enhanced transport format combination indicator (E-TFCI) for high speed uplink packet access (HSUPA) is outside of a valid range of reference E-TFCIs; means for identifying a highest reference E-TFCI within the valid range; means for determining a gain factor for the first E-TFCI based on the highest reference E-TFCI within the valid range; and means for transmitting a signal at a power level that is based on the gain factor.

Another aspect of the disclosure provides an apparatus for wireless communication that includes at least one processor and a memory coupled to the at least one processor. The at least one processor is configured to determine that a first enhanced transport format combination indicator (E-TFCI) for high speed uplink packet access (HSUPA) is outside of a valid range of reference E-TFCIs; identify a highest reference E-TFCI within the valid range; determine a gain factor for the first E-TFCI based on the highest reference E-TFCI within the valid range; and transmit a signal at a power level that is based on the gain factor.

Another aspect of the disclosure provides a non-transitory computer-readable medium having instructions for causing a computer to determine that a first enhanced transport format combination indicator (E-TFCI) for high speed uplink packet access (HSUPA) is outside of a valid range of reference E-TFCIs; identify a highest reference E-TFCI within the valid range; determine a gain factor for the first E-TFCI based on the highest reference E-TFCI within the valid range; and transmit a signal at a power level that is based on the gain factor.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The description set forth below in connection with the appended drawings is intended as a description of various configurations and is not intended to represent the only configurations in which the concepts and features described herein may be practiced. The following description includes specific details for the purpose of providing a thorough understanding of various concepts. However, it will be apparent to those skilled in the art that these concepts may be practiced without these specific details. In some instances, well known circuits, structures, techniques and components are shown in block diagram form to avoid obscuring the described concepts and features.

Figure 1:
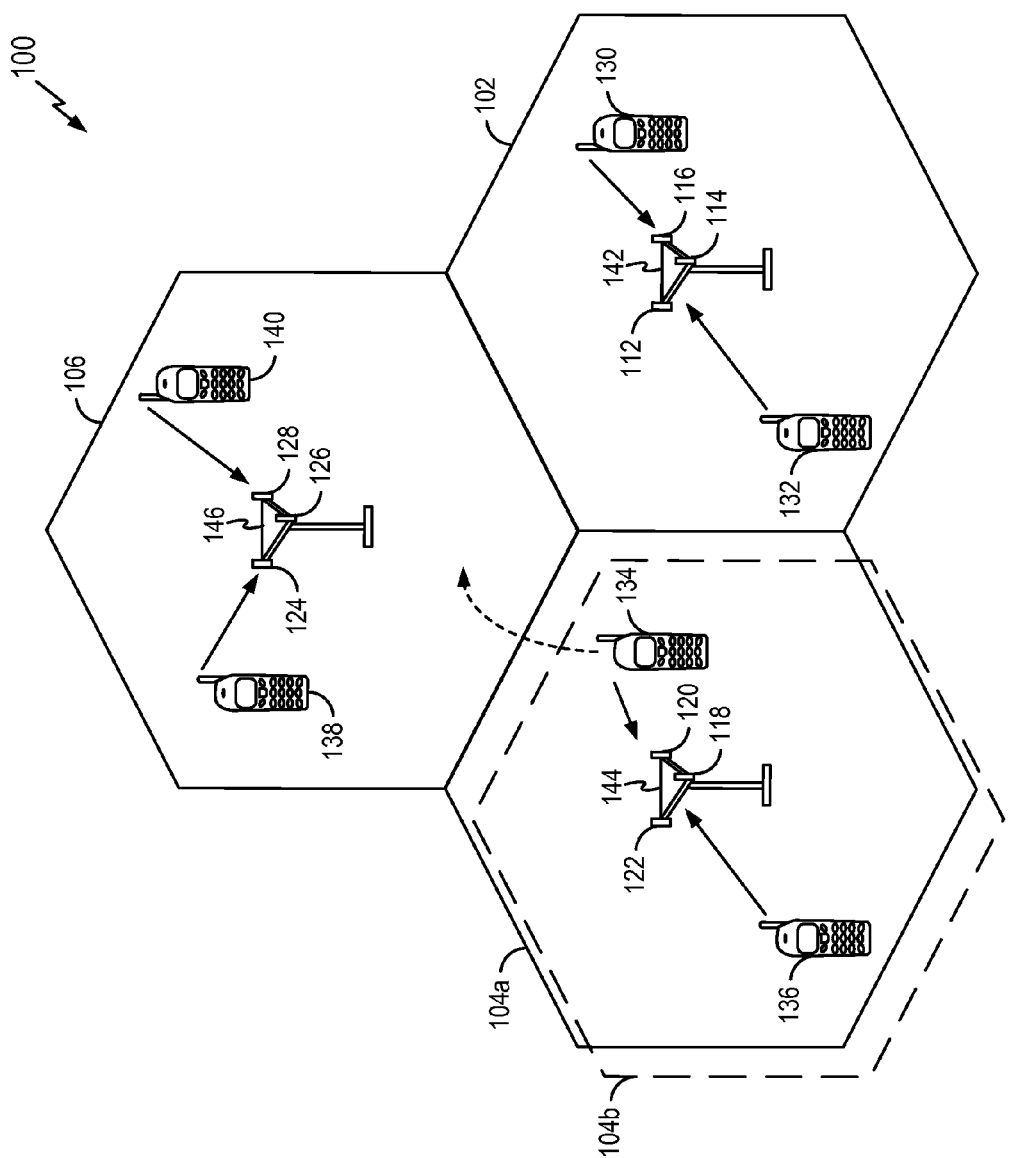
FIG. 1 is a conceptual diagram illustrating an example of a network environment in which one or more aspects of the present disclosure may find application.

The various concepts presented throughout this disclosure may be implemented across a broad variety of telecommunication systems, network architectures, and communication standards. Referring to FIG. 1, by way of example and without limitation, a simplified access network 100 in a UMTS Terrestrial Radio Access Network (UTRAN) architecture, which may utilize High-Speed Packet Access (HSPA), is illustrated. The system includes multiple cellular regions (cells), including cells 102, 104, and 106, each of which may include one or more sectors. Cells may be defined geographically, e.g., by coverage area, and/or may be defined in accordance with a frequency, scrambling code, etc. That is, the illustrated geographically-defined cells 102, 104, and 106 may each be further divided into a plurality of cells, e.g., by utilizing different frequencies or scrambling codes. For example, cell 104a may utilize a first frequency or scrambling code, and cell 104b, while in the same geographic region and served by the same Node B 144, may be distinguished by utilizing a second frequency or scrambling code.

In a cell that is divided into sectors, the multiple sectors within a cell can be formed by groups of antennas with each antenna responsible for communication with UEs in a portion of the cell. For example, in cell 102, antenna groups 112, 114, and 116 may each correspond to a different sector. In cell 104, antenna groups 118, 120, and 122 each correspond to a different sector. In cell 106, antenna groups 124, 126, and 128 each correspond to a different sector.

The cells 102, 104 and 106 may include several UEs that may be in communication with one or more sectors of each cell 102, 104 or 106. For example, UEs 130 and 132 may be in communication with Node B 142, UEs 134 and 136 may be in communication with Node B 144, and UEs 138 and 140 may be in communication with Node B 146. Here, each Node B 142, 144, 146 is configured to provide an access point to a core network 204 (see FIG. 2) for all the UEs 130, 132, 134, 136, 138, 140 in the respective cells 102, 104, and 106.

Figure 2:
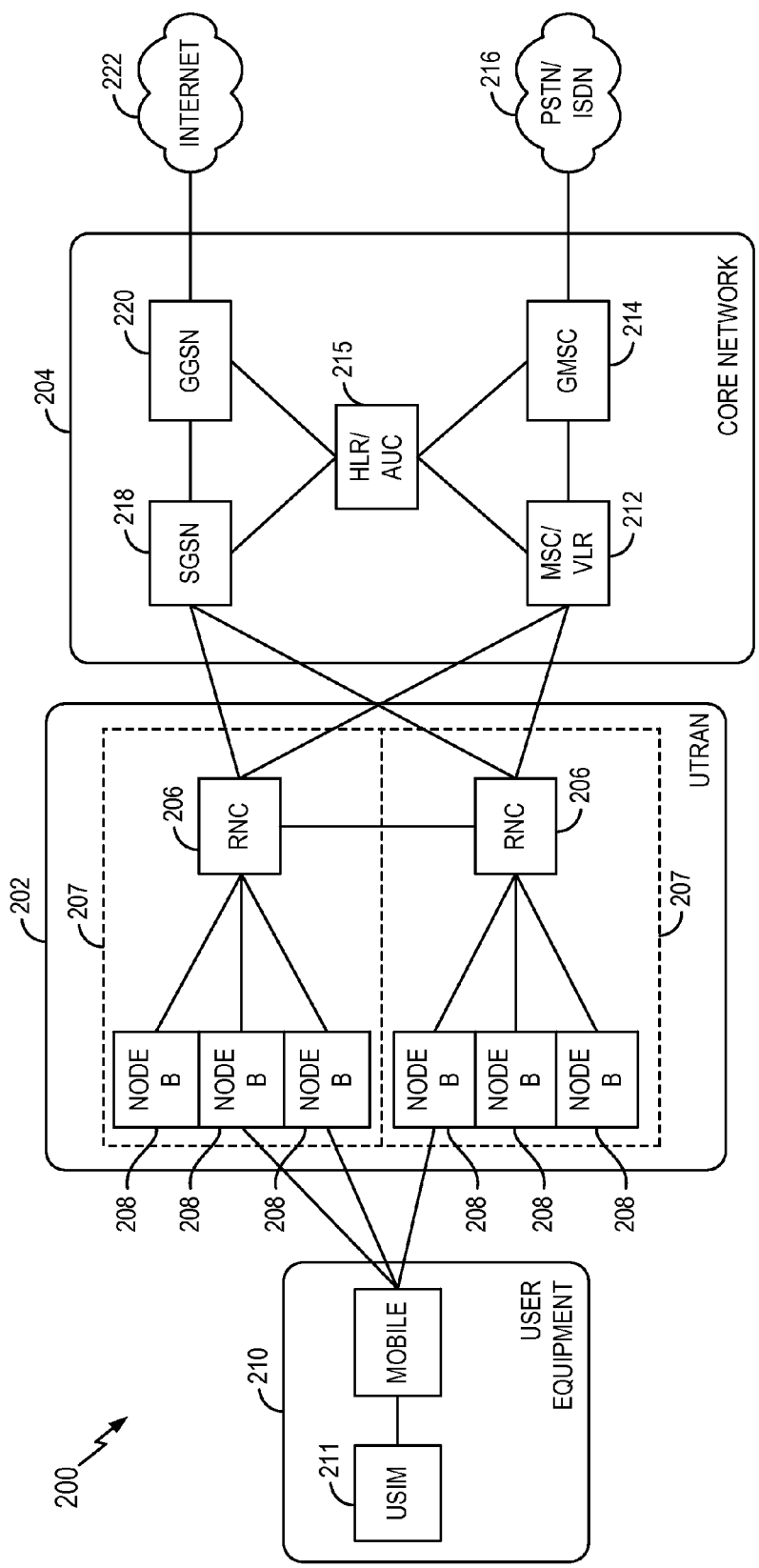
FIG. 2 is a block diagram illustrating an example of a communication system in which one or more aspects of the disclosure may find application.

Referring now to FIG. 2, by way of example and without limitation, various aspects of the present disclosure are illustrated with reference to a Universal Mobile Telecommunications System (UMTS) system 200 employing a wideband code division multiple access (W-CDMA) air interface. A UMTS network includes three interacting domains: a Core Network (CN) 204, a UMTS Terrestrial Radio Access Network (UTRAN) 202, and User Equipment (UE) 210. In this example, the UTRAN 202 may provide various wireless services including telephony, video, data, messaging, broadcasts, and/or other services. The UTRAN 202 may include a plurality of Radio Network Subsystems (RNSs) such as the illustrated RNSs 207, each controlled by a respective Radio Network Controller (RNC) such as an RNC 206. Here, the UTRAN 202 may include any number of RNCs 206 and RNSs 207 in addition to the illustrated RNCs 206 and RNSs 207. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a UMTS core network. However, as those skilled in the art will recognize, the various concepts presented throughout this disclosure may be implemented in a RAN, or other suitable access network, to provide UEs with access to types of core networks other than UMTS networks.

The illustrated UMTS core network 204 includes a circuit-switched (CS) domain and a packet-switched (PS) domain. Some of the circuit-switched elements are a Mobile services Switching Centre (MSC), a Visitor Location Register (VLR), and a Gateway MSC (GMSC). Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains.

In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The illustrated core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface may be a spread spectrum Direct-Sequence Code Division Multiple Access (DS-CDMA) system. The spread spectrum DS-CDMA spreads user data through multiplication by a sequence of pseudo-random bits called chips. The W-CDMA air interface for UMTS is based on such DS-CDMA technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles are equally applicable to a TD-SCDMA air interface.

A high speed packet access (HSPA) air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

Figure 3:
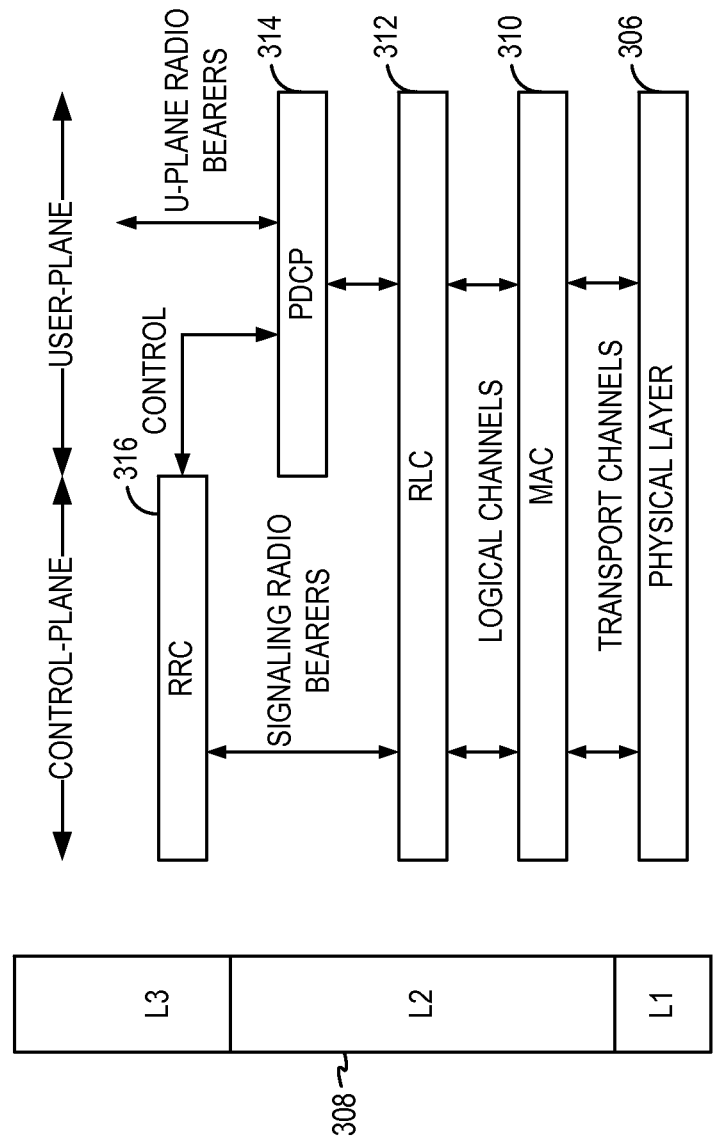
FIG. 3 is a conceptual diagram illustrating an example of a radio protocol architecture for a user plane and a control plane.

In a wireless telecommunication system, the radio protocol architecture between a mobile device and a cellular network may take on various forms depending on the particular application. An example for a 3GPP high-speed packet access (HSPA) system will now be presented with reference to FIG. 3, illustrating an example of the radio protocol architecture for the user and control planes between the UE 210 and the Node B 208. Here, the user plane or data plane carries user traffic, while the control plane carries control information, i.e., signaling.

Turning to FIG. 3, the radio protocol architecture for the UE 210 and Node B 208 is shown with three layers: Layer 1, Layer 2, and Layer 3. Although not shown, the UE 210 may have several upper layers above the L3 layer including a network layer (e.g., IP layer) that is terminated at a PDN gateway on the network side, and an application layer that is terminated at the other end of the connection (e.g., far end UE, server, etc.).

At Layer 3, the RRC layer 316 handles control plane signaling between the UE 210 and the Node B 208. RRC layer 316 includes a number of functional entities for routing higher layer messages, handling broadcast and paging functions, establishing and configuring radio bearers, etc.

The data link layer, called Layer 2 (L2 layer) 308 is between Layer 3 and the physical layer 306, and is responsible for the link between the UE 210 and Node B 208. In the illustrated air interface, the L2 layer 308 is split into sublayers. In the control plane, the L2 layer 308 includes two sublayers: a medium access control (MAC) sublayer 310 and a radio link control (RLC) sublayer 312. In the user plane, the L2 layer 308 additionally includes a packet data convergence protocol (PDCP) sublayer 314. Of course, those of ordinary skill in the art will comprehend that additional or different sublayers may be utilized in a particular implementation of the L2 layer 308, still within the scope of the present disclosure.

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between Node Bs.

The RLC sublayer 312 provides segmentation and reassembly of upper layer data packets, retransmission of lost data packets, and reordering of data packets to compensate for out-of-order reception due to a hybrid automatic repeat request (HARQ).

The MAC sublayer 310 provides multiplexing between logical channels and transport channels. The MAC sublayer 310 is also responsible for allocating the various radio resources (e.g., resource blocks) in one cell among the UEs. The MAC sublayer 310 is also responsible for HARQ operations.

Layer 1 is the lowest layer and implements various physical layer signal processing functions. Layer 1 will be referred to herein as the physical layer (PHY) 306. At the PHY layer 306, the transport channels are mapped to different physical channels.

Data generated at higher layers, all the way down to the MAC layer 310, are carried over the air through transport channels. 3GPP Release 5 specifications introduced downlink enhancements referred to as HSDPA. HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries HARQ ACK/NACK signaling on the uplink to indicate whether a corresponding packet transmission was decoded successfully. That is, with respect to the downlink, the UE 210 provides feedback to the Node B 208 over the HS-DPCCH to indicate whether it correctly decoded a packet on the downlink.

HS-DPCCH further includes feedback signaling from the UE 210 to assist the Node B 208 in taking the right decision in terms of modulation and coding scheme and precoding weight selection, this feedback signaling including the channel quality indicator (CQI) and precoding control information (PCI).

3GPP Release 6 specifications introduced uplink enhancements referred to as Enhanced Uplink (EUL) or High Speed Uplink Packet Access (HSUPA). HSUPA utilizes as its transport channel the EUL Dedicated Channel (E-DCH). The E-DCH is transmitted in the uplink together with the Release 99 DCH. The control portion of the DCH, that is, the DPCCH, carries pilot bits and downlink power control commands on uplink transmissions. In the present disclosure, the DPCCH may be referred to as a control channel (e.g., a primary control channel) or a pilot channel (e.g., a primary pilot channel) in accordance with whether reference is being made to the channel's control aspects or its pilot aspects.

The E-DCH is implemented by physical channels including the E-DCH Dedicated Physical Data Channel (E-DPDCH) and the E-DCH Dedicated Physical Control Channel (E-DPCCH). In addition, HSUPA relies on additional physical channels including the E-DCH HARQ Indicator Channel (E-HICH), the E-DCH Absolute Grant Channel (E-AGCH), and the E-DCH Relative Grant Channel (E-RGCH).

Further, in accordance with aspects of the present disclosure, for HSUPA with multiple-input, multiple-output (MIMO) utilizing two transmit antennas, the physical channels include a Secondary E-DPDCH (S-E-DPDCH), a Secondary E-DPCCH (S-E-DPCCH), and a Secondary DPCCH (S-DPCCH). MIMO is a term generally used to refer to multi-antenna technology, that is, multiple transmit antennas (multiple inputs to the channel) and multiple receive antennas (multiple outputs from the channel). MIMO systems typically provide enhanced data transmission performance, enabling diversity gains to reduce multipath fading and increase transmission quality, and spatial multiplexing gains to increase data throughput.

Generally, for MIMO systems utilizing n transmit antennas, n transport blocks may be transmitted simultaneously over the same carrier utilizing the same channelisation code. Note that the different transport blocks sent over the n transmit antennas may have the same or different modulation and coding schemes from one another.

In summary, UMTS networks utilize a channel structure whereby logical channels (e.g., logical control and traffic channels for uplink and downlink traffic) are mapped to transport channels which are, in turn, mapped to the physical channels. Different frame structures, coding, and operating modes may be deployed depending on, for example, the traffic being carried and deployments decisions.

Gain Factors for HSUPA Power Control

In HSUPA, more than one EUL transport channel can be carried by a physical channel. The term EUL transport format combination (E-TFC) refers to the number of transport blocks transmitted via the transport channel(s) during a TTI. The different supported E-TFCs are identified by corresponding E-TFC indicators (E-TFCIs). Thus, a given E-TFCI corresponds to a given E-DCH block size. A UE selects the E-TFC to be used for a given transmission (e.g., for a given TTI) based on the amount of data the UE needs to transmit and the available transmit power.

In UMTS, transmit power allocated for a data channel may be tied to the transmit power of an associated control channel. For example, power control of an UL E-DPDCH relates to power control of an UL E-DPCCH according to a defined power offset referred to as a gain factor.

A UE calculates the final gain factor (referred to as βed) to use for a given E-DPDCH based on the E-TFC to be transmitted. This calculation takes a corresponding HARQ profile into account to account for retransmission and quality of service (QoS) requirements.

The network can influence the power offset to be used by the UE when transmitting a particular block size. For example, the network associates different power offsets with different E-TFCIs to enable a UE to transmit at a higher transmit power when transmitting at a higher data rate. Thus, a higher power offset can be associated with a higher E-TFCI.

To enable a UE to calculate the gain factor based on the E-TFCI-specific power offsets, the network sends associated E-TFCI and power offset information to the UEs in the network. In practice, however, there may be a relatively large number of E-TFCIs (e.g., 128). Consequently, to reduce signaling overhead, the network does not send the mapping between all possible E-TFCIs (i.e., all possible E-TFCs) and all corresponding gain factors to the UEs in the network. Instead, the network sends to the UEs the mapping for a smaller number of reference E-TFCIs. The gain factor to be used for a given E-TFCI according to conventional techniques is thus determined via interpolation between two of the reference E-TFCIs or via extrapolation based on a single reference E-TFCI.

3GPP 25.214 specifies how the gain factor βed (also referred to as BetaEd) for HSUPA power control is calculated for a given E-TFCI. Specifically, sections 5.1.2.5B.2.3 and 5.1.2.5B.2.4, quoted below, list several equations for generating βed under different scenarios. In these equations, the βed for a given E-TFCI is computed based on the signaled settings for one or more reference E-TFCIs. For purposes of discussion herein, equation numbers have been inserted into the quoted text of these sections.

Section 5.1.2.5B.2.3 of 3GPP 25.214 v11.7.0 (September 2013) entitled "Computation of gain factors" recites as follows:

"When E-DPDCH power extrapolation formula is configured, let βed,ref denote the reference gain factor of the reference E-TFC. Let Le,ref denote the number of E-DPDCHs used for the reference E-TFC and Le,i denote the number of E-DPDCHs used for the i:th E-TFC. If SF2 is used, Le,ref and Le,i are the equivalent number of physical channels assuming SF4. Let Ke,ref denote the transport block size of the reference E-TFC and Ke,i denote the transport block size of the i:th E-TFC, where the mapping between the E-TFCI and the E-DCH transport block size is defined in [3]. For the i:th E-TFC, the temporary variable βed,i,harq is then computed as:

$$\beta_{ed,i,harq} = \beta_{ed,ref} \sqrt{\frac{L_{e,ref}}{L_{e,i}}} \sqrt{\frac{K_{e,i}}{K_{e,ref}}} \cdot 10^{\left(\frac{\Delta_{harq}}{20}\right)} \quad \text{[EQUATION 1]}$$

where the HARQ offset Δharq is defined in [2] subclause 4.2.1.3

When E-DPDCH power interpolation formula is configured, let βed,ref,1 and βed,ref,2 denote the reference gain factors of the primary and secondary reference E-TFCs respectively. Let Le,ref,1 and Le,ref,2 denote the number of E-DPDCHs used for the primary and secondary reference E-TFCs respectively. Let Le,i denotes the number of E-DPDCHs used for the i:th E-TFC. If SF2 is used, Le,ref,1, Le,ref,2 and Le,i are the equivalent number of physical channels assuming SF4. Let Ke,ref,1 and Ke,ref,2 denote the transport block sizes of the primary and secondary reference E-TFCs respectively. Let Ke,i denotes the transport block size of the i:th E-TFC, where the mapping between the E-TFCI and the E-DCH transport block size is defined in [3]. For the i:th E-TFC, the temporary variable $\beta_{ed,i,harq}$ is computed as:

$$\beta_{ed,i,harq} = \sqrt{\frac{L_{e,ref,1}}{L_{e,i}}} \cdot$$ [EQUATION 2]

$$\sqrt{\left(\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)\right) \cdot 10^{\left(\frac{\Delta harq}{20}\right)}}{(K_{e,i} - K_{e,ref,1}) + \beta_{ed,ref,1}^2}$$

with the exception that $\beta_{ed,i,harq}$ is set to 0 if $$\left(\frac{\frac{L_{e,ref,2}}{L_{e,ref,1}}\beta_{ed,ref,2}^2 - \beta_{ed,ref,1}^2}{K_{e,ref,2} - K_{e,ref,1}}\right)(K_{e,i} - K_{e,ref,1}) + \beta_{ed,ref,1}^2 \leq 0$$ [EQUATION 3]

For the i:th E-TFC, the unquantized gain factor $\beta_{ed,k,i,uq}$ for the k:th E-DPDCH (denoted E-DPDCHk in [2] subclause 4.2.1.3) shall be set to sqrt(2)×$\beta_{ed,i,harq}$ if the spreading factor for E-DPDCHk is 2 and to $\beta_{ed,i,harq}$ otherwise."

Section 5.1.2.5B.2.4 of 3GPP 25.214 v11.7.0 (September 2013) entitled "E-DPDCH/DPCCH adjustments relating to compressed mode" recites as follows:
"If E-DPDCH power extrapolation formula is configured, $$\beta_{ed,C,i} = \beta_{c,C,j} \cdot A_{ed} \cdot \sqrt{\frac{L_{e,ref}}{L_{e,i}}} \cdot \sqrt{\frac{K_{e,i}}{K_{e,ref}}} \cdot 10^{\left(\frac{\Delta harq}{20}\right)} \cdot \sqrt{\frac{N_{pilot,C}}{N_{pilot,N}}}$$ [EQUATION 4]

Else if E-DPDCH power interpolation formula is configured, $$\beta_{ed,C,i} = \beta_{c,C,j} \cdot \sqrt{\frac{L_{e,ref,1}}{L_{e,i}}} \cdot$$ [EQUATION 5]

$$\sqrt{\left(\left(\frac{\frac{L_{e,ref,2}}{L_{e,ref,1}}A_{ed,2}^2 - A_{ed,1}^2}{K_{e,ref,2} - K_{e,ref,1}}\right)(K_{e,i} - K_{e,ref,1}) + A_{ed,1}^2\right)} \cdot$$

$$10^{\left(\frac{\Delta harq}{20}\right)} \cdot \sqrt{\frac{N_{pilot,C}}{N_{pilot,N}}}$$

with the exception that $\beta_{ed,C,i}$ is set to 0 if $$\left(\frac{\frac{L_{e,ref,2}}{L_{e,ref,1}}A_{ed,2}^2 - A_{ed,1}^2}{K_{e,ref,2} - K_{e,ref,1}}\right)(K_{e,i} - K_{e,ref,1}) + A_{ed,1}^2 \leq 0$$ [EQUATION 6]

where $\beta_{c,C,j}$ is calculated for the j:th TFC as described in [1] subclause 5.1.2.5.4 if at least one DPDCH is configured. In case no DPDCH is configured, the $\beta_{c,C,j}$ value is set as described in subclause 5.1.2.5C. Aed, Aed,1 and Aed,2 are as defined in [2] subclause 4.2.1.3. Aed,1 and Aed,2 denote the quantized amplitude ratios assigned to the primary and secondary reference E-TFCs respectively.

Le,ref, Le,i, Ke,ref, Ke,i, L,e,ref,1, Le,ref,2, Ke,ref,1 and Ke,ref,2 are as defined in [1] subclause 5.1.2.5B.2.3, Δharq is as defined in [2] subclause 4.2.1.3, Npilot,C is the number of pilot bits per slot on the DPCCH in compressed frames, and Npilot,N is the number of pilot bits per slot in non-compressed frames."

For conventional HSUPA power control, the two reference βed values, βed,ref 2 and βed,ref 1, used for E-DPDCH power interpolation (as opposed to extrapolation) according to Equations 2 and 3 are selected as follows. Let E-TFCIi denote the E-TFCI of the i:th E-TFC. For the i:th E-TFC:

1 if E-TFCI$_i \geq$E-TFCI$_{ref,M}$, the primary and secondary reference E-TFCs are the (M−1):th and M:th reference E-TFCs respectively.
2 if E-TFCI$_i <$E-TFCI$_{ref,1}$, the primary and secondary reference E-TFCs are the 1st and 2nd reference E-TFCs respectively.
3 if E-TFCI$_{ref,1}<=$E-TFCI$_i<$E-TFCI$_{ref,M}$, the primary and secondary reference E-TFCs are the m:th and (m+1):th reference E-TFCs respectively, such that E-TFCI$_{ref,m}<=$E-TFCI$_i<$E-TFCI$_{ref,m+1}$.

A problem may arise, however, with interpolation configured by the network. The network may specify the maximum Allowed spreading factor (e.g., "maxChannelisationCodes") to be used by a UE as well as a puncturing limit (e.g., "pl-NonMax") to be used by the UE. In some cases, however, the "maxChannelisationCodes" and/or the "pl-NonMax" configured by the network may restrict the maximum allowed E-TFCI (maxAllowed UE E-TFCI). The "maxChannelisationCodes" and "pl-NonMax" configured by the network are used while calculating the spreading factor for each of the E-TFCIs transmitted by the UE on the uplink and determining the maxAllowed UE E-TFCI in a given network configuration. For example, in a multi-RAB scenario, even when "maxChannelisationCodes" configured by the network is 2XN2+2XN4 or 2XM2+2XM4, "maxChannelisationCodes" is implicitly restricted by the UE to 2XSF2 which restricts the maxAllowed UE E-TFCI and, hence, limits the reference E-TFCIs which are in a "valid" range in a given network configuration. The reason the UE implicitly restricts "maxChannelisationCodes" in this MRAB scenario (i.e., DPDCH and E-DPDCH configured) is in accordance with table 0 defined in the 3GPP 25.213 specification as follows:

TABLE 0

Maximum number of simultaneously-configured uplink dedicated channels

| | DPDCH | HS-DPCCH | E-DPDCH | E-DPCCH |
|---|---|---|---|---|
| Case 1 | 6 | 1 | — | — |
| Case 2 | 1 | 1 | 2 | 1 |
| Case 3 | — | 1 | 4 | 1 |

The UE cannot have DPDCH configured if there are 4 E-DPDCHs; hence, the UE implicitly restricts the "maxChannelisationCodes" to 2XSF2.

In another scenario with a sub-optimal network configuration, reconfiguration of the EUL can result in a change in "pl-NonMax" and/or "maxChannelisationCodes" for a given reference E-TFCI/Power Offset value configured by the network. This reconfiguration can impact the maxAllowed UE E-TFCI and, hence, will limit the reference E-TFCIs which are in a "valid" range in a given network configuration.

As one non-limiting example, a UE might only be allowed to use up to E-TFCI 99. Consequently, any reference E-TF-CIs corresponding to an E-TFCI above 99 would be outside of the "valid" range. As another non-limiting example, one or more of the following operations may be employed to determine a range assuming an E-TFCI range of 0-127. The high end (e.g., E-TFCIs 120-127) may be cut-off based on the UE category/capability (e.g., according to Table 0). Alternatively, or in addition, the range may be limited based on the transmit power of the UE. For example, the UE may determine that it cannot support E-TFCIs 110-119 even after the high end is cut-off. In some scenarios, the network may send a signal to the UE to indicate the maximum power the UE is allowed to use. Thus, network action may result in the exclusion of some E-TFCIs. Alternatively, or in addition, some E-TFCIs could be excluded based on the UE's capability of supporting a certain combination of spreading factors (e.g., as discussed herein). At the low end, there may be a minimum set of E-TFCIs that is always guaranteed.

Thus, when interpolation is configured by the network, the reference E-TFCIs and respective reference power offsets configured by the network may be set such that one or more of the reference E-TFCIs are <=a maximum UE allowed E-TFCI value. This may result in some of the reference E-TFCIs falling outside of a "valid" range.

For example, and without limitation, the network may configure the following reference E-TFCIs: $E\text{-}TFCI_{ref,1}$, $E\text{-}TFCI_{ref,2}$, $E\text{-}TFCI_{ref,3}$, $E\text{-}TFCI_{ref,4}$, and $E\text{-}TFCI_{ref,5}$. The maximum allowed E-TFCI will be referred to as E-TFCI_X. In an example scenario to be used for purposes of illustration, $E\text{-}TFCI_{ref,3}<E\text{-}TFCI\_X<E\text{-}TFCI_{ref,4}<E\text{-}TFCI_{ref,5}$. In this example scenario, $E\text{-}TFCI_{ref,4}$ and $E\text{-}TFCI_{ref,5}$ are outside the valid range of reference E-TFCIs set to be used for calculating βed using a conventional interpolation formula.

As stated in 3GPP 25.331 Section 8.6.6.37: "NOTE 2: If a reference E-TFCI signaled to the UE is outside the UE physical channel capability, the UE behavior is unspecified." Thus, the standard does not indicate how E-TFCI can be calculated for the example scenario.

Of note, if only valid reference E-TFCIs are used to calculate βed, the resulting βed may be relatively low. For example, $E\text{-}TFCI_{ref,2}$ and $E\text{-}TFCI_{ref,3}$ can be used to calculate βed using interpolation for a range of $E\text{-}TFCI_i$ such that $E\text{-}TFCI_i > E\text{-}TFCI_{ref,3}$ and $E\text{-}TFCI_i <= X$. In this case, however, a relatively high EUL block error rate (BLER) may be seen for higher E-TFCIs since a relatively low βed value is calculated for these E-TFCIs. In other words, the low βed value in this sub-optimal network configuration may cause poor EUL throughput (e.g., in bits per second).

Optimized βed Calculation

In accordance with the teachings herein, calculation of βed can be optimized for a range of E-TFCIs (e.g., $E\text{-}TFCI_i > E\text{-}TFCI_{ref,3}$ to the largest "valid" $E\text{-}TFCIi <= E\text{-}TFCI\_X$), on the UE side to avoid poor EUL performance in a sub-optimal network configuration. Four examples of techniques for calculating βed that may be used (e.g., at a UE) in the event of such a sub-optimal network configuration follow.

First Option

In a first option, βed is calculated using an interpolation formula that uses a reference power offset (Ref_PO) for an E-TFCI that is within the valid range and a Ref_PO for an E-TFCI that is not within the valid range. For example, $E\text{-}TFCI_{ref,3}$ and $E\text{-}TFCI_{ref,4}$ can be used in the interpolation formula (e.g., Equations 2 and 3) for calculating $E\text{-}TFCI_i$ in the scenario where $E\text{-}TFCI_{ref,3}<E\text{-}TFCI_i<=E\text{-}TFCI\_X<E\text{-}TFCI_{ref,4}$. That is, the $E\text{-}TFCI_{ref,4}$ Ref_PO is deemed to be valid for calculating βed even though $E\text{-}TFCI_{ref,4}$ is outside of the valid range of reference E-TFCI values. In some aspects, the first option may provide very good performance in a sub-optimal network configuration since the resulting βed may be higher than a βed associated with $E\text{-}TFCI_{ref,3}$.

Figure 4:
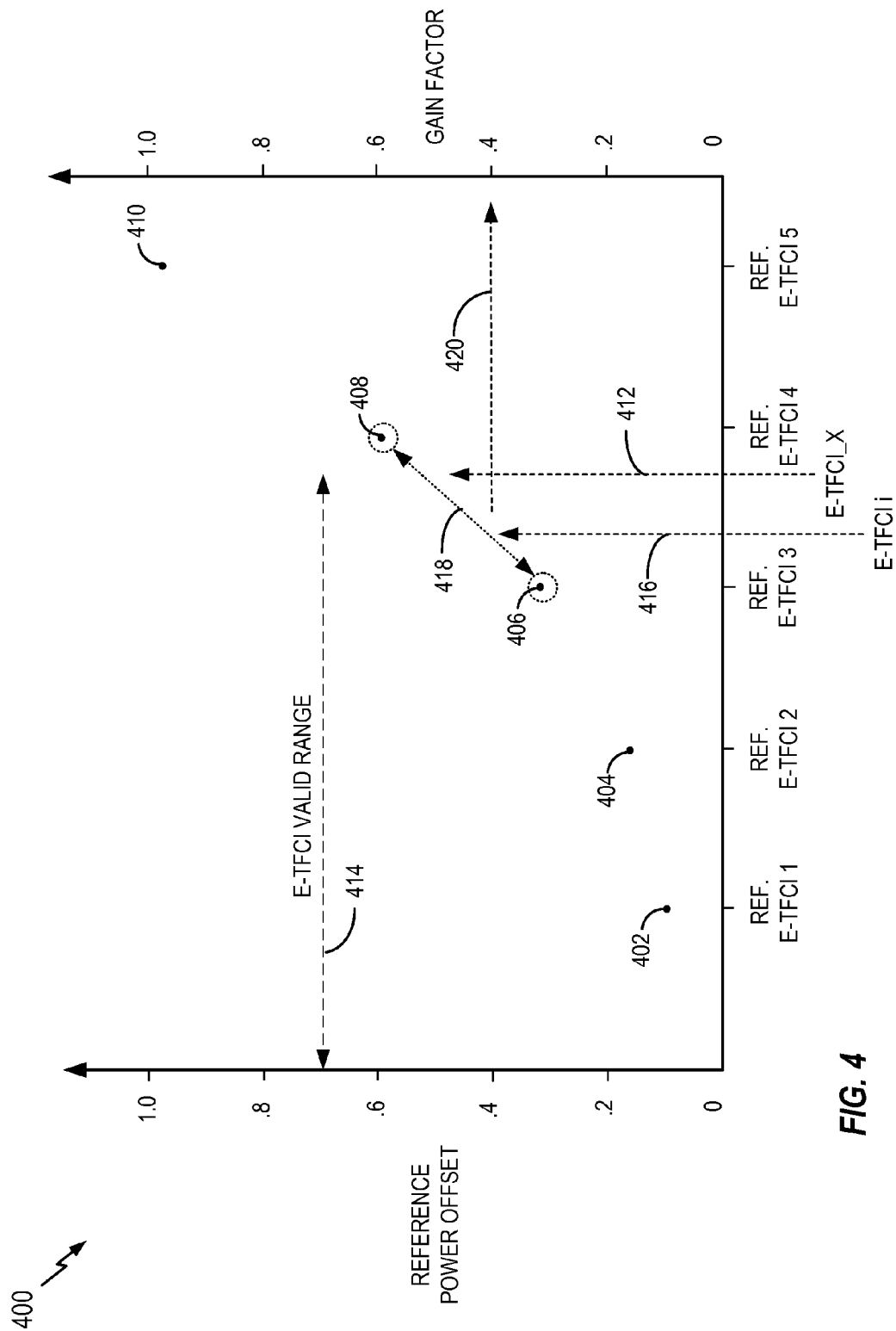
FIG. 4 is a graph illustrating an example of an interpolation-based gain factor calculation in accordance with some aspects of the disclosure.

FIG. 4 graphically illustrates an example of interpolation according to the first option. In the graph 400, E-TFCIs are represented by the x-axis, reference power offsets associated with the E-TFCIs are represented by the left y-axis, and gain factors are represented by the right y-axis. The gain factor values represent the gain factors that may be calculated according to an interpolation algorithm (e.g., Equations 2 and 3) based on two of the reference power offsets associated with the E-TFCIs. It should be understood that the reference power offsets and the gain factor values set forth in FIG. 4 are for purposes of illustration and that other reference power offset and gain factor values may be applicable in different implementations.

Five reference E-TFCIs are plotted on the graph 400 at points 402, 404, 406, 408, and 410. A maximum E-TFCI value (E-TFCI_X) is represented by a dashed line 412. Accordingly, the valid range for E-TFCIs is represented by a dashed line 414.

An E-TFCIi value that is higher than the highest valid reference E-TFCI (E-TFCI 3) is represented by a dashed line 416. In accordance with the first option and as represented by a dashed line 418, the interpolation algorithm interpolates between the reference power offsets for the reference E-TFCI 3 and the reference E-TFCI 4 to calculate a gain factor for this E-TFCIi value (as further represented by a dashed line 420). Thus, an E-TFCI (E-TFCI 4) that is outside of the valid range (see dashed line 414) is used to calculate the gain factor in this case.

Second Option

In a second option, βed is calculated using an interpolation formula that uses the reference power offsets of two E-TFCIs that are within the valid range. For example, $E\text{-}TFCI_{ref,2}$ and $E\text{-}TFCI_{ref,3}$ can be used in the interpolation formula (e.g., Equations 2 and 3) for calculating $E\text{-}TFCI_i$ in the scenario where $E\text{-}TFCI_{ref,3}<E\text{-}TFCI_i<=E\text{-}TFCI\_X<E\text{-}TFCI_{ref,4}$. In this case, $E\text{-}TFCI_{ref,4}$ and $E\text{-}TFCI_{ref,5}$ are ignored for the βed calculation since these reference E-TF-CIs are outside the valid range.

Figure 5:
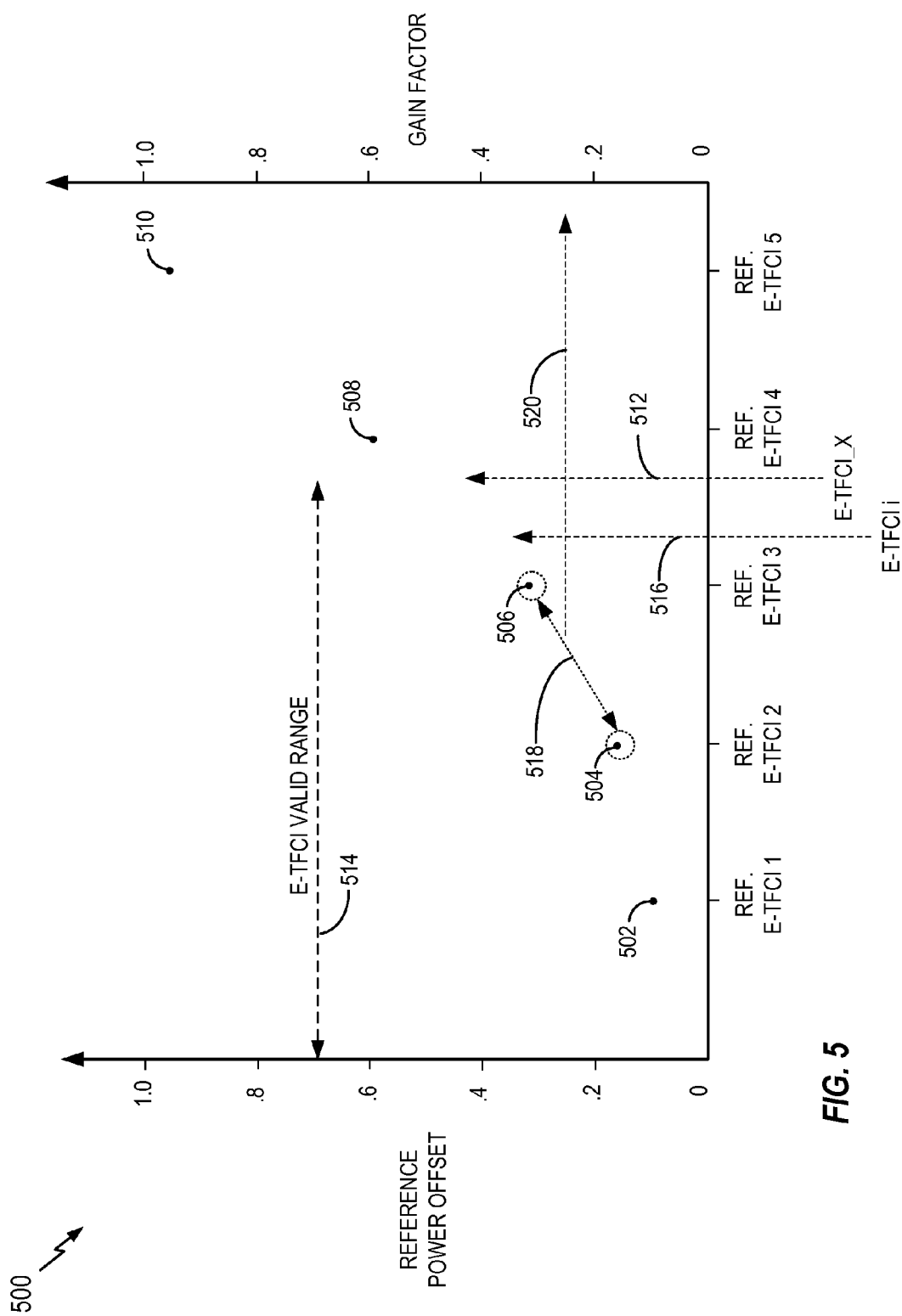
FIG. 5 is a graph illustrating another example of an interpolation-based gain factor calculation in accordance with some aspects of the disclosure.

FIG. 5 graphically illustrates an example of interpolation according to the second option. In the graph 500, E-TFCIs are represented by the x-axis, reference power offsets associated with the E-TFCIs are represented by the left y-axis, and gain factors are represented by the right y-axis. The gain factor values represent the gain factors that may be calculated according to an interpolation algorithm (e.g., Equations 2 and 3) based on two of the reference power offsets associated with the E-TFCIs. It should be understood that the reference power offsets and the gain factor values set forth in FIG. 5 are for purposes of illustration and that other reference power offset and gain factor values may be applicable in different implementations.

Five reference E-TFCIs are plotted on the graph 500 at points 502, 504, 506, 508, and 510. A maximum E-TFCI value (E-TFCI_X) is represented by a dashed line 512. Accordingly, the valid range for E-TFCIs is represented by a dashed line 514.

An E-TFCIi value that is higher than the highest valid reference E-TFCI (E-TFCI 3) is represented by a dashed line 516. In accordance with the second option and as represented by a dashed line 518, the interpolation algorithm interpolates between the reference power offsets for the two highest valid reference E-TFCIs: reference E-TFCI 2 and reference E-TFCI 3 to calculate a gain factor for this E-TFCIi value (as further represented by a dashed line 520).

Third Option

In a third option, βed is calculated using an extrapolation formula that uses a Ref_PO for an E-TFCI that is within the valid range. For example, the Ref_PO for E-TFCI$_{ref,3}$ can be used for the extrapolation formula (e.g., Equation 1) for calculating E-TFCI$_i$ in the scenario where E-TFCI$_{ref,3}$<E-TFCIi<=E-TFCI_X<E-TFCI$_{ref,4}$. Of note, however, the third option uses extrapolation even though the network may have configured a UE to use interpolation.

Figure 6:
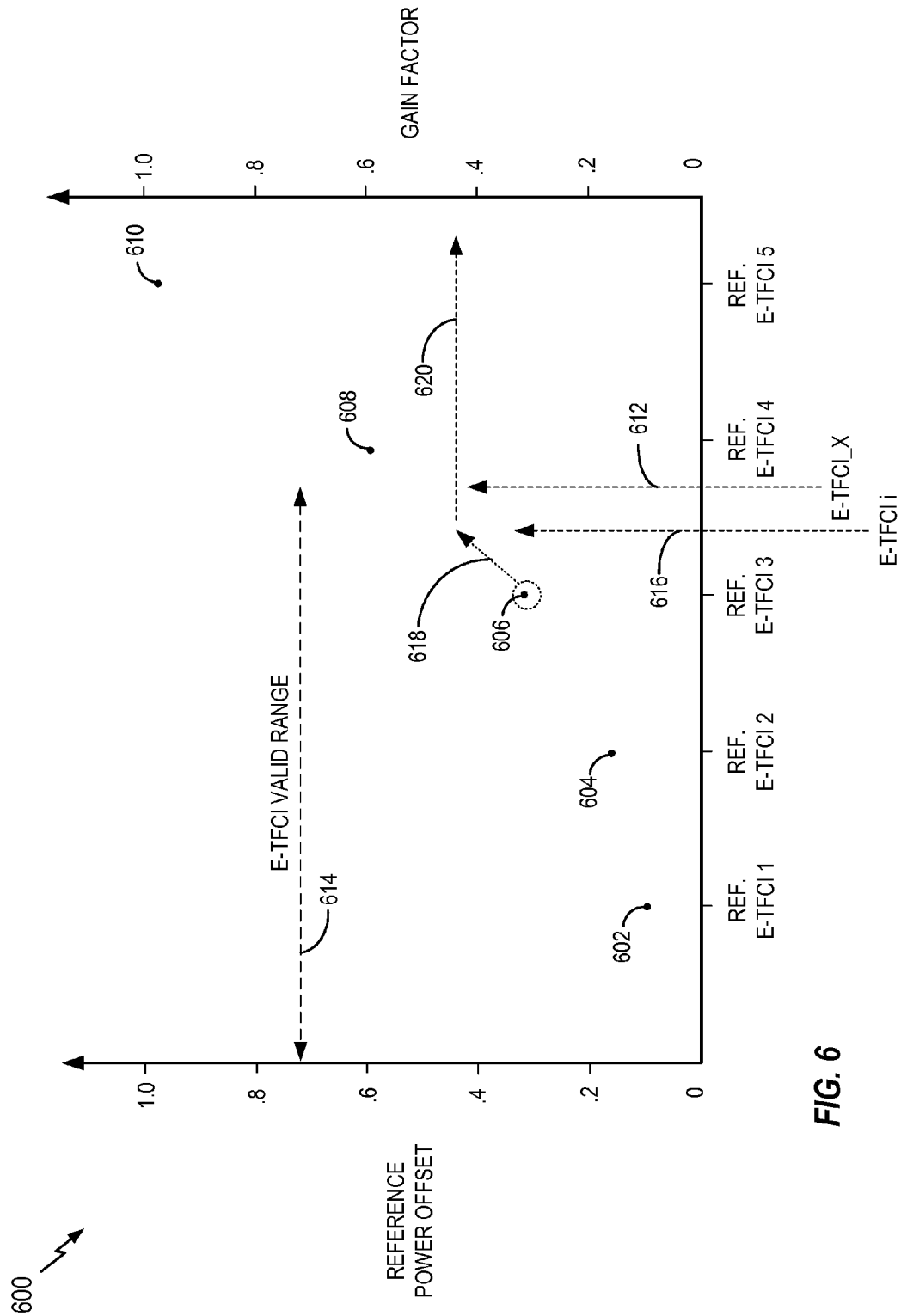
FIG. 6 is a graph illustrating an example of extrapolation-based gain factor calculation in accordance with some aspects of the disclosure.

FIG. 6 graphically illustrates an example of extrapolation according to the third option. In the graph 600, E-TFCIs are represented by the x-axis, reference power offsets associated with the E-TFCIs are represented by the left y-axis, and gain factors are represented by the right y-axis. The gain factor values represent the gain factors that may be calculated according to an extrapolation algorithm (e.g., Equation 1) based on one of the reference power offsets associated with the E-TFCIs. It should be understood that the reference power offsets and the gain factor values set forth in FIG. 6 are for purposes of illustration and that other reference power offset and gain factor values may be applicable in different implementations.

Five reference E-TFCIs are plotted on the graph 600 at points 602, 604, 606, 608, and 610. A maximum E-TFCI value (E-TFCI_X) is represented by a dashed line 612. Accordingly, the valid range for E-TFCIs is represented by a dashed line 614.

An E-TFCIi value that is higher than the highest valid reference E-TFCI (E-TFCI 3) is represented by a dashed line 616. In accordance with the third option and as represented by a dashed line 618, the extrapolation algorithm extrapolates from the reference power offset for the reference E-TFCI 3 to calculate a gain factor for this E-TFCIi value (as further represented by a dashed line 620). Thus, a gain factor for an E-TFCIi value that is higher than the highest valid reference E-TFCI (E-TFCI 3) can be obtained in this case.

Fourth Option

In a fourth option, initially, βed for E-TFCI_X is calculated using an extrapolation formula. Then, for the range of E-TFCIs (e.g., E-TFCI$_i$>E-TFCI$_{ref,3}$ to the largest "valid" E-TFCI$_i$<E-TFCI_X), βed is calculated using the Ref_PO for E-TFCI$_{ref,3}$ and the βed for E-TFCI_X through the use of an interpolation formula (e.g., Equations 2 and 3).

As a specific example, the fourth option can use an extrapolation formula to calculate βed for E-TFCI=E-TFCI_X (i.e., calculating βed_X) by using Equation 1 to extrapolate from E-TFCI$_{ref,3}$ and assuming Δharq as 0. An interpolation formula based on Equations 2 and 3 can then be used to calculate βed for the range of E-TFCIi values such that E-TFCI$_{ref,3}$<E-TFCI$_i$<E-TFCI_X by using the Ref_PO for E-TFCI$_{ref,3}$ and the calculated βed_X as the two reference values for the interpolation formation. With this approach, the HARQ offset, Δharq, is generally used for calculating βed_X using the extrapolation formula and is calculated per TTI, which may increase the complexity of the operation. To simplify this operation, the HARQ offset, Δharq, can be assumed as 0 for calculating βed_X using the extrapolation formula. Of note, the fourth option uses extrapolation even though the network may have configured a UE to use interpolation.

Figure 7:
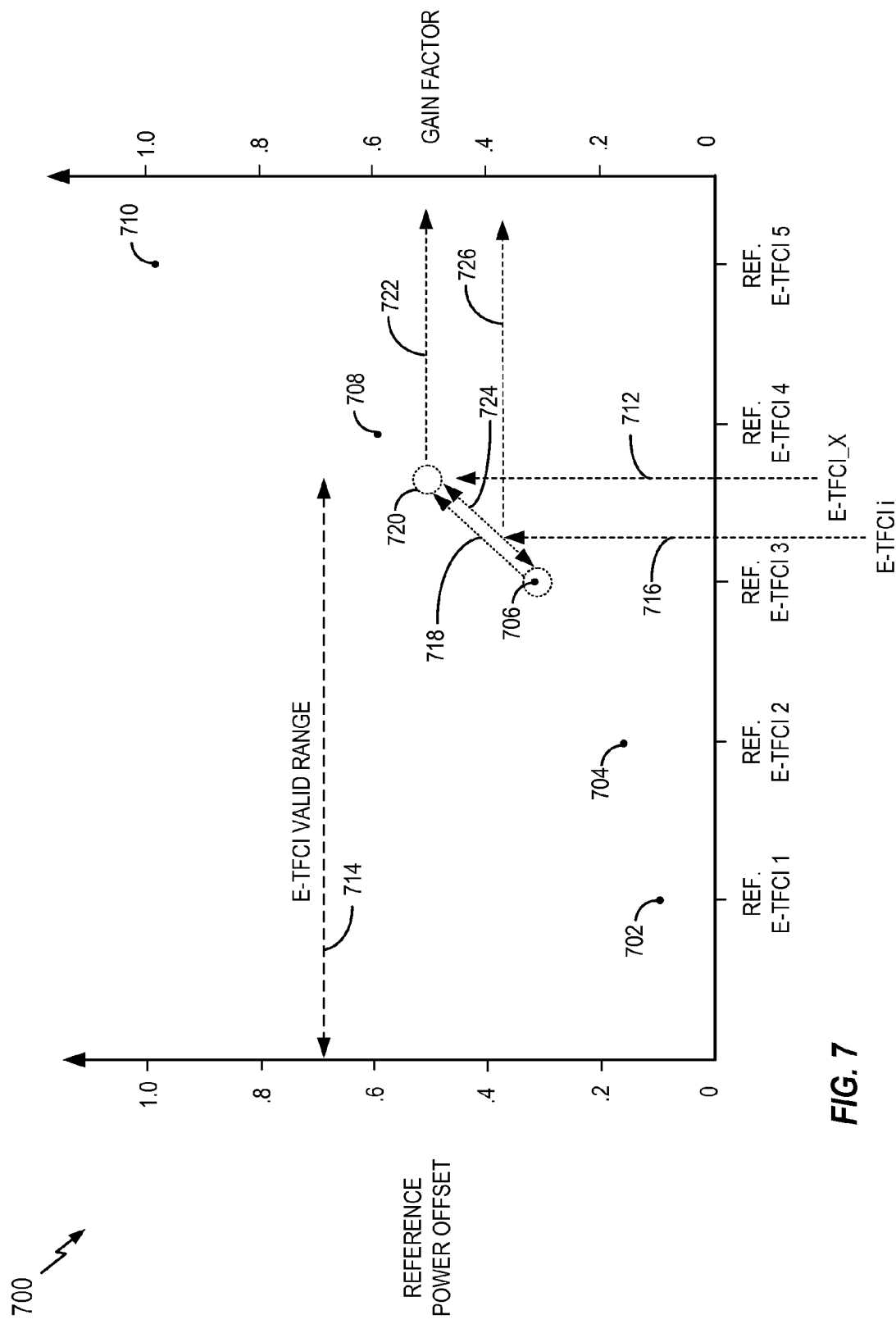
FIG. 7 is a graph illustrating an example of an extrapolation and interpolation-based gain factor calculation in accordance with some aspects of the disclosure.

FIG. 7 graphically illustrates an example of extrapolation and interpolation according to the fourth option. In the graph 700, E-TFCIs are represented by the x-axis, reference power offsets associated with the E-TFCIs are represented by the left y-axis, and gain factors are represented by the right y-axis. The gain factor values represent the gain factors that may be calculated according to an interpolation algorithm (e.g., Equations 2 and 3) or an extrapolation algorithm (e.g., Equation 1) based on one or more of the reference power offsets associated with the E-TFCIs. It should be understood that the reference power offsets and the gain factor values set forth in FIG. 7 are for purposes of illustration and that other reference power offset and gain factor values may be applicable in different implementations.

Five reference E-TFCIs are plotted on the graph 700 at points 702, 704, 706, 708, and 710. A maximum E-TFCI value (E-TFCI_X) is represented by a dashed line 712. Accordingly, the valid range for E-TFCIs is represented by a dashed line 714.

An E-TFCIi value that is higher than the highest valid reference E-TFCI (E-TFCI 3) is represented by a dashed line 716. In accordance with the fourth option and as represented by a dashed line 718, an extrapolation algorithm extrapolates from the reference power offset for the reference E-TFCI 3 to calculate a gain factor for the maximum E-TFCI value (E-TFCI_X), as represented by a dashed circle 720 and a dashed line 722. Further in accordance with the fourth option and as represented by a dashed line 724, an interpolation algorithm interpolates between the reference power offset for the reference E-TFCI 3 and the gain factor for E-TFCI_X to calculate a gain factor for the E-TFCIi of interest (as further represented by a dashed line 724). Thus, a gain factor for the maximum E-TFCI (E-TFCI_X) is used to calculate the gain factor in this case.

Additional Aspects

Figure 8:
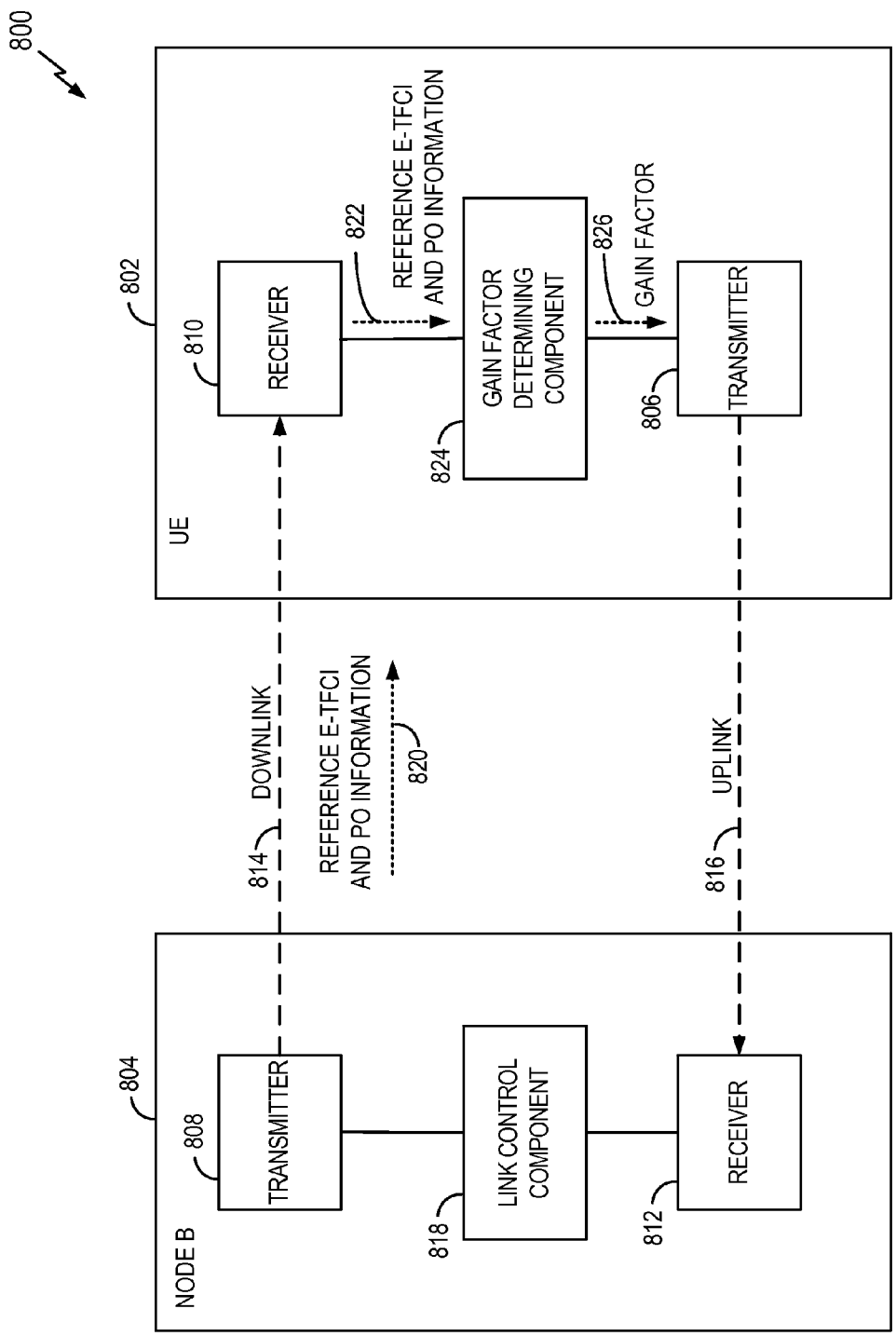
FIG. 8 is a block diagram illustrating an example of a communication system where a UE is configured to determine (e.g., generate) a gain factor in accordance with some aspects of the disclosure.
Figure 9:
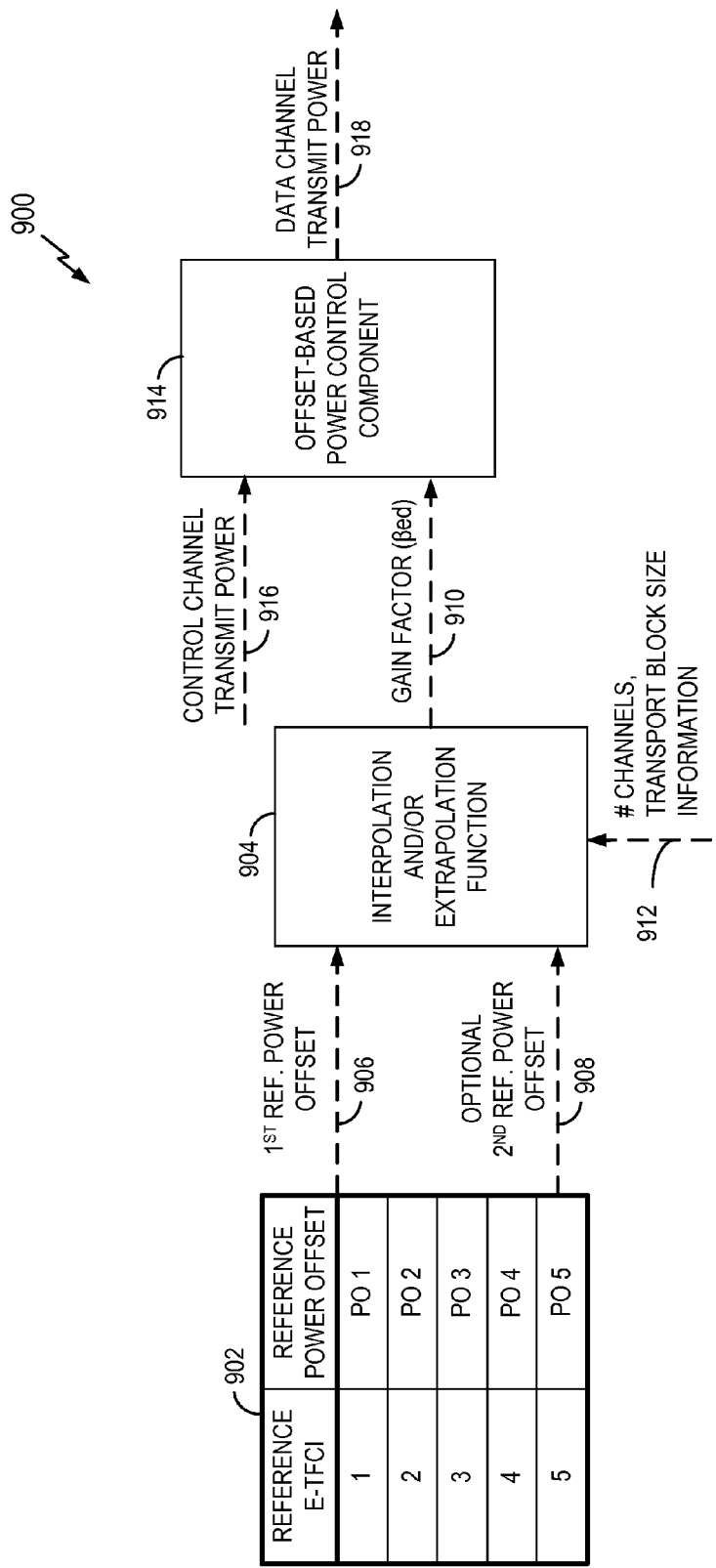
FIG. 9 is a block diagram illustrating an example of a system employing transmit power control based on a gain factor in accordance with some aspects of the disclosure.
Figure 10:
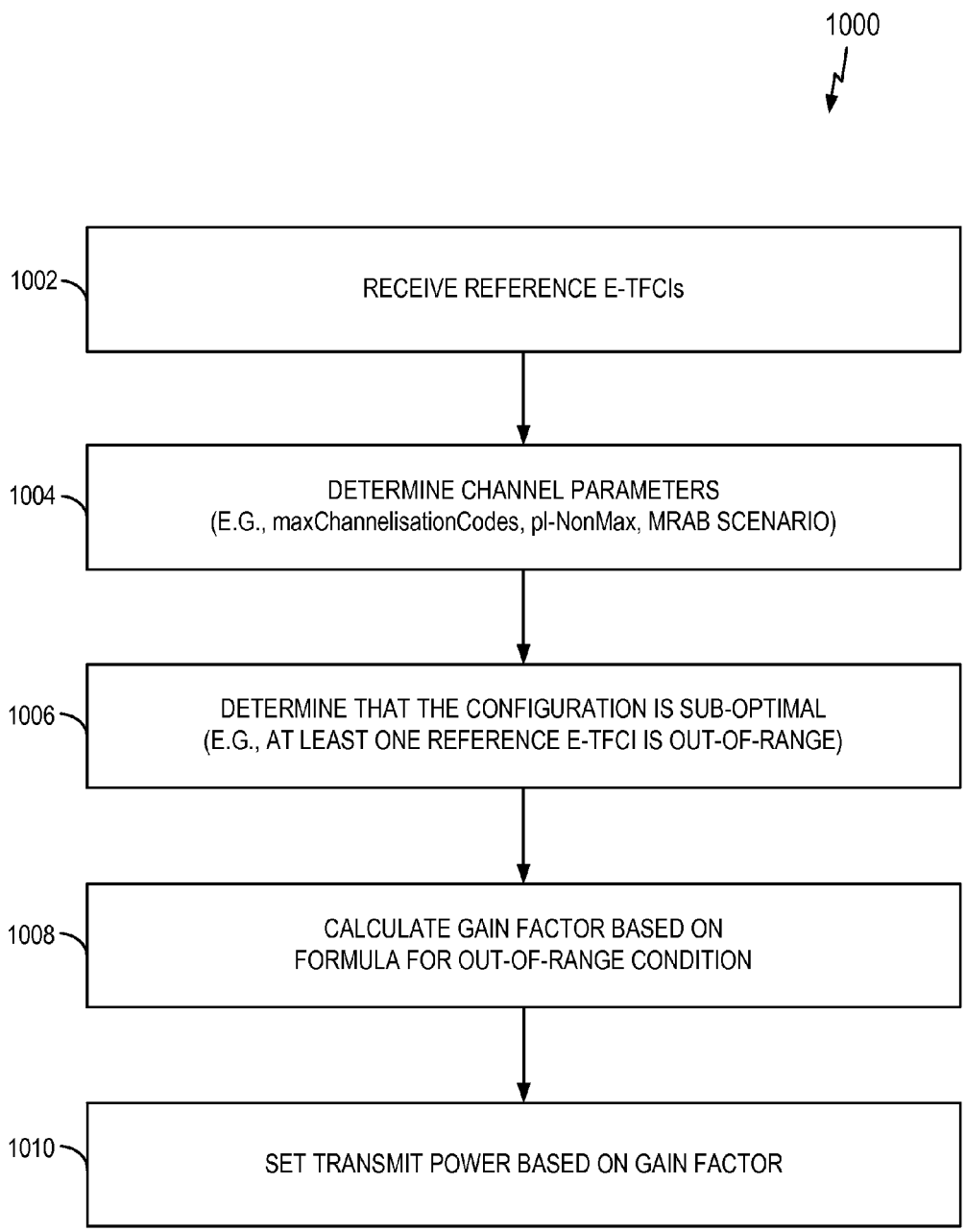
FIG. 10 is a flowchart illustrating a method of transmit power control in accordance with some aspects of the disclosure.

Referring to FIGS. 8-10, various aspects of a power control scheme according to the present disclosure are presented. For purposes of illustration, and without limitation, these aspects of the disclosure may be described in the context of a UMTS-based network where a Node B serves a user equipment (UE). It should be appreciated that the disclosed aspects may be applicable to other types of apparatuses and other technology. For example, in the UE and Node B context, gain factors are typically used as a means to control uplink power. However, the teachings herein also could be applied to control downlink power, peer-to-peer link power, or some other aspect of these or other types of communication links.

In the communication system 800 of FIG. 8, a UE 802 is served by a Node B 804. The UE 802 and the Node B 804 include respective transmitters 806 and 808 and receivers 810 and 812 for communicating via a downlink 814 and an uplink 816 as indicated.

A link control component 818 of the Node B 804 may specify the reference E-TFCIs and the corresponding reference power offsets for the UE 802. As represented by a dashed line 820, the transmitter 808 of the Node B 8094 transmits this reference E-TFCI and power offset (PO) information to the receiver 810 of the UE 802. The receiver 810, in turn, passes reference E-TFCI and PO information 822 to a gain factor determining component 824.

The gain factor determining component 824 calculates a gain factor in accordance with the teachings herein. Accordingly, the gain factor determining component 824 may calculate a gain factor for an E-TFCI according to one of the four options if there is a sub-optimal configuration. For example, one of the four options may be used in the event the calculation of the gain factor is not defined according to the 3GPP specification due to one or more reference E-TF- CIs being outside of a valid range of reference E-TFCIs. Conversely, in the event the calculation of the gain factor is defined according to the 3GPP specification (e.g., all of the reference E-TFCIs are within of the valid range of reference E-TFCIs), the gain factor determining component 824 may calculate a gain factor for an E-TFCI according to conventional interpolation or extrapolation techniques (i.e., without using one of the four options).

The gain factor determining component 824 passes the generated gain factor 826 (e.g., βed) or a parameter based on the gain factor 826 to the transmitter 806. Accordingly, the transmitter 806 transmits the corresponding E-TFC on the uplink transport channels (via E-DPDCH) using a transmit power that is based on the gain factor 826.

FIG. 9 illustrates, in a simplified manner, a system 900 that uses reference power offsets for reference E-TFCIs for offset-based power control. In some implementations, the system 900 can be implemented within the gain factor determining component 824 of FIG. 8.

A table 902 associates a given reference E-TFCI with a corresponding reference power offset. Accordingly, upon determining that a given reference E-TFCI is to be used for power control, the appropriate reference power offset is retrieved from the table 902.

Each reference power offset is provided to an interpolation and/or extrapolation function 904. As discussed herein, in some cases, a single reference power offset is used by an interpolation algorithm or an extrapolation algorithm. Accordingly, a $1^{st}$ reference power offset 906 is provided to the interpolation and/or extrapolation function 904 in this case. Alternatively, in other cases, two reference power offsets are used by an interpolation algorithm. Accordingly, the $1^{st}$ reference power offset 906 and a $2^{nd}$ reference power offset 908 may be provided to the interpolation and/or extrapolation function 904.

The interpolation and/or extrapolation function 904 calculates a gain factor 910 in accordance with the teachings herein. Accordingly, the interpolation and/or extrapolation function 904 may calculate the gain factor 910 for an E-TFCI according to one of the four options if there is a sub-optimal configuration or according to a conventional algorithm in other scenarios. Accordingly, in some implementations, the interpolation and/or extrapolation function 904 only provides interpolation (e.g., for the first option and for conventional interpolation). Alternatively, the interpolation and/or extrapolation function 904 could provide both interpolation and extrapolation (e.g., for the fourth option and for conventional interpolation) in some implementations. In addition, the interpolation and/or extrapolation function 904 could provide only extrapolation in some implementations.

As indicated by Equations 1-6, an interpolation algorithm or an extrapolation algorithm receives other input information in addition to the reference power offsets. Accordingly, as indicated in FIG. 9, an algorithm may be based on information (e.g., control channel transmit power 916) relating to the number of channels and the transport block size associated with an E-TFC to be transmitted.

An offset-based power control component 914 uses the gain factor 910 to set data channel transmit power as an offset from control channel transmit power. Accordingly, the offset-based power control component 914 receives an indication of control channel transmit power 916 and the gain factor 910, and generates an indication of data channel transmit power 918.

FIG. 10 illustrates a process 1000 for EUL transmit power control in accordance with some aspects of the present disclosure. The process 1000 may take place within a processing system 1914 (FIG. 19), which may be located at an access terminal (e.g., a UE), at a base station (e.g., a Node B), or some other suitable apparatus. In another aspect, the process 1000 may be implemented by the UE 210 and/or the Node B 208 illustrated in FIG. 2. In some implementations, the process 1000 can be implemented by the gain factor determining component 824 of FIG. 8 and/or by other components of the UE 802. Of course, in various aspects within the scope of the present disclosure, the process 1000 may be implemented by any suitable apparatus capable of supporting transmit power control operations.

In block 1002, reference E-TFCIs are received. For example, a UE may receive these parameters from the network. Accordingly, in some implementations, the receiver 810 of FIG. 8 performs the operations of block 1002.

In block 1004, various channel parameters associated with a transmission are determined. For example, a UE may receive a maxChannelisationCodes parameter and/or a pl-NonMax parameter from the network. Also, a UE may determine that a MRAB scenario exists. In some implementations, the gain factor determining component 824 of FIG. 8 performs the operations of block 1004.

In block 1006, a determination is made that the current configuration is sub-optimal. For example, a UE may determine that at least one reference E-TFCI is out of the valid range. In some implementations, the gain factor determining component 824 of FIG. 8 performs the operations of block 1006.

In block 1008, a gain factor (e.g., βed) is calculated based on a formula for an out-of-range condition. For example, the gain factor may be calculated using one of the four options described above. In some implementations, the gain factor determining component 824 of FIG. 8 performs the operations of block 1008.

In block 1010, EUL transmit power is set based on the gain factor calculated at block 1008. For example, the gain factor may be applied to the transmit power for a control channel to determine the transmit power to be used for an EUL data channel. In some implementations, the transmitter 806 of FIG. 8 performs the operations of block 1010.

Figure 11:
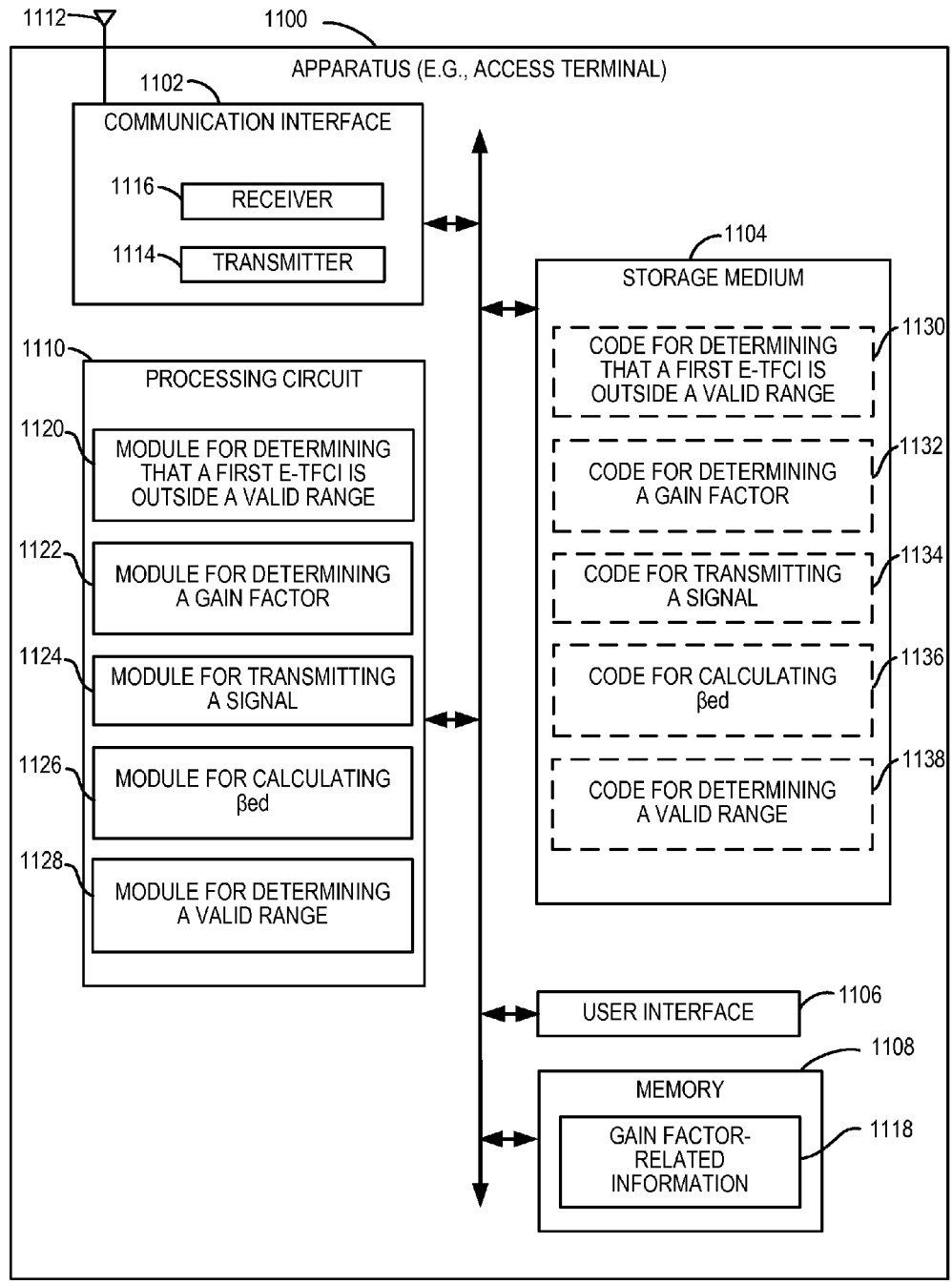
FIG. 11 is a block diagram illustrating select components of an apparatus configured to determine a gain factor in accordance with some aspects of the disclosure.

FIG. 11 is an illustration of an exemplary apparatus 1100 (e.g., an access terminal) configured according to one or more aspects of the present disclosure. The apparatus 1100 includes a communication interface (e.g., at least one transceiver) 1102, a storage medium 1104, a user interface 1106, a memory 1108, and a processing circuit 1110. These components can be coupled to and/or placed in electrical communication with one another via a signaling bus or other suitable component. In particular, each of the communication interface 1102, the storage medium 1104, the user interface 1106, and the memory 1108 are coupled to and/or in electrical communication with the processing circuit 1110.

The communication interface 1102 may be adapted to facilitate wireless communication of the apparatus 1100. For example, the communication interface 1102 may include circuitry and/or programming adapted to facilitate the communication of information bi-directionally with respect to one or more communication devices in a network. The communication interface 1102 may be coupled to one or more antennas 1112 for wireless communication within a wireless communication system. The communication interface 1102 can be configured with one or more standalone receivers and/or transmitters, as well as one or more transceivers. In the illustrated example, the communication interface 1102 includes a transmitter 1114 and a receiver 1116.

The memory 1108 may represent one or more memory devices. As indicated, the memory 1108 may store gain factor-related information 1118 along with other information used by the apparatus 1100. In some implementations, the memory 1108 and the storage medium 1104 are implemented as a common memory component. The memory 1108 may also be used for storing data that is manipulated by the processing circuit 1110 or some other component of the apparatus 1100.

The storage medium 1104 may represent one or more computer-readable, machine-readable, and/or processor-readable devices for storing programming, such as processor executable code or instructions (e.g., software, firmware), electronic data, databases, or other digital information. The storage medium 1104 may also be used for storing data that is manipulated by the processing circuit 1110 when executing programming. The storage medium 1104 may be any available media that can be accessed by a general purpose or special purpose processor, including portable or fixed storage devices, optical storage devices, and various other mediums capable of storing, containing or carrying programming.

By way of example and not limitation, storage medium 1104 may include a storage device that includes a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, or any other suitable storage device for storing software and/or instructions that may be accessed and read by a computer or a communication device. The storage medium 1104 may be embodied in an article of manufacture (e.g., a computer program product). By way of example, a computer program product may include a computer-readable medium in packaging materials. Thus, in some implementations, the storage medium may be a non-transitory (e.g., tangible) storage medium.

The storage medium 1104 may be coupled to the processing circuit 1110 such that the processing circuit 1110 can read information from, and write information to, the storage medium 1104. That is, the storage medium 1104 can be coupled to the processing circuit 1110 so that the storage medium 1104 is at least accessible by the processing circuit 1110, including examples where at least one storage medium is integral to the processing circuit 1110 and/or examples where at least one storage medium is separate from the processing circuit 1110 (e.g., resident in the apparatus 1100, external to the apparatus 1100, distributed across multiple entities).

Programming stored by the storage medium 1104, when executed by the processing circuit 1110, causes the processing circuit 1110 to perform one or more of the various functions and/or process steps described herein. For example, the storage medium 1104 may include operations configured for regulating operations at one or more hardware blocks of the processing circuit 1110, as well as to utilize the communication interface 1102 for wireless communication utilizing their respective communication protocols.

The processing circuit 1110 is generally adapted for processing, including the execution of such programming stored on the storage medium 1104. As used herein, the term "programming" or the term "code" shall be construed broadly to include without limitation instructions, instruction sets, data, code, code segments, program code, programs, subprograms, software modules, applications, software applications, software packages, routines, subroutines, objects, executables, threads of execution, procedures, functions, programming, etc., whether referred to as software, firmware, middleware, microcode, hardware description language, or otherwise.

The processing circuit 1110 is arranged to obtain, process and/or send data, control data access and storage, issue commands, and control other desired operations. The processing circuit 1110 may include circuitry configured to implement desired programming provided by appropriate media in at least one example. For example, the processing circuit 1110 may be implemented as one or more processors, one or more controllers, and/or other structure configured to execute executable programming. Examples of the processing circuit 1110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1110 are for illustration and other suitable configurations within the scope of the present disclosure are also contemplated. Also, any of the modules 1120-1128 of the processing circuit 1110 may be arranged or configured in a similar manner. For example, the modules 1120-1128 may be arranged to obtain, process and/or send data, control data access and storage, issue commands, and control other desired operations; may be configured to implement desired programming; may be implemented as appropriate structure configured to execute executable programming; may be implemented as a combination of computing components or other circuitry; and so on.

According to one or more aspects of the present disclosure, the processing circuit 1110 may be adapted to perform any or all of the features, processes, functions, steps and/or routines for any or all of the apparatuses described herein. As used herein, the term "adapted" in relation to the processing circuit 1110 may refer to the processing circuit 1110 being one or more of configured, employed, implemented, and/or programmed to perform a particular process, function, step and/or routine according to various features described herein.

According to at least one example of the apparatus 1100, the processing circuit 1110 may include a module for determining that a first E-TFCI is outside a valid range 1120, a module for determining a gain factor 1122, a module for transmitting a signal 1124, a module for calculating βed 1126, and a module for determining a valid range 1128.

The module for determining that a first E-TFCI is outside a valid range 1120 may include circuitry and/or programming adapted to perform several functions relating to, for example, determining whether an E-TFCI associated with a transmission is outside of a range associated with valid reference E-TFCIs. For example, the module for determining that a first E-TFCI is outside a valid range 1120 obtains a designated E-TFCI (e.g., directly from a component that determines the E-TFCI or from the memory 1108). In addition, the module for determining that a first E-TFCI is outside a valid range 1120 obtains an indication of the valid range (e.g., directly from a component that determines the range or from the memory 1108). The module for determining that a first E-TFCI is outside a valid range 1120 then determines whether the E-TFCI is within the range or outside the range. The module for determining that a first E-TFCI is outside a valid range 1120 outputs an indication of whether the E-TFCI is outside the range for access by another component of the processing circuit 1110 or some other component of the apparatus 1100. For example, the module for determining that a first E-TFCI is outside a valid range 1120 can pass this indication to another component of the apparatus 1100 or store acquired information in the memory 1108. In some implementations, the programming referred to above includes code for determining that a first E-TFCI is outside a valid range 1130 stored on the storage medium 1104.

The module for determining a gain factor 1122 may include circuitry and/or programming adapted to perform several functions relating to, for example, generating a gain factor based on input information. Initially, the module for determining a gain factor 1122 obtains the input information (e.g., passed from another component of the apparatus 1100 such as the receiver 1116 or the memory 1108). In some implementations, the input information includes at least one reference E-TFCI, channel information, and block size information. In some implementations, the module for determining a gain factor 1122 implements an algorithm that operates on the input information to generate a gain factor. For example, in some implementations, the module for determining a gain factor 1122 performs operations according to one or more of the first option, the second option, the third option, the fourth option, Equation 1, Equation 2, Equation 3, Equation 4, Equation 5, or Equation 6 as discussed herein. The module for determining a gain factor 1122 then outputs an indication of the determined gain factor. For example, the module for determining a gain factor 1122 can pass the indication to another component of the apparatus 1100 or store the indication in the memory 1108. In some implementations, the programming referred to above includes code for determining a gain factor 1132 stored on the storage medium 1104.

The module for transmitting a signal 1124 may include circuitry and/or programming adapted to perform several functions relating to, for example, transmitting at a transmit power that is based on a gain factor. Initially, the module for transmitting a signal 1124 obtains data to be transmitted. For example, the module for transmitting a signal 1124 may obtain this data directly from a component of the apparatus (e.g., the memory 1108 or some other component). In some implementations, the module for transmitting a signal 1124 processes (e.g., encodes) the data to be transmitted. The module for transmitting a signal 1124 then causes the data to be transmitted at a power level that is based on the gain factor (e.g., obtained from the module 1122 or from the memory 1108). For example, the module for transmitting a signal 1124 can pass the data to the transmitter 1114. In some implementations, the programming referred to above includes code for transmitting a signal 1134 stored on the storage medium 1104.

The module for calculating βed 1126 may include circuitry and/or programming adapted to perform several functions relating to, for example, using extrapolation to generate a gain factor based on input information. Initially, the module for calculating βed 1126 obtains the input information (e.g., passed from another component of the apparatus 1100 such as the receiver 1116 or the memory 1108). In some implementations, the input information includes one reference E-TFCI, channel information, and block size information. In some implementations, the module for calculating βed 1126 implements an algorithm that operates on the input information to generate a gain factor. For example, in some implementations, the module for calculating βed 1126 performs operations according to one or more of the second option, the fourth option, Equation 1, or Equation 4 as discussed herein. The module for calculating βed 1126 then outputs an indication of the determined gain factor. For example, the module for calculating βed 1126 can pass the indication to another component of the apparatus 1100 or store the indication in the memory 1108. In some implementations, the programming referred to above includes code for calculating βed 1136 stored on the storage medium 1104.

Finally, the module for determining a valid range 1128 may include circuitry and/or programming adapted to perform several functions relating to, for example, determining a valid range for E-TFCIs and/or reference E-TFCIs. Initially, the module for determining a valid range 1128 acquires information that may affect the valid range (e.g., from the memory 1108 or directly from another module). For example, this information may relate to one or more of a spreading factor, a puncturing limit, or MRAB as discussed herein. The module for determining a valid range 1128 then processes this information to determine whether the E-TFCIs are limited. The module for determining a valid range 1128 then outputs an indication of the valid range. For example, the module for determining a valid range 1128 can pass the indication to another component of the apparatus 1100 or store the indication in the memory 1108. In some implementations, the programming referred to above includes code for determining a valid range 1138 stored on the storage medium 1104.

As mentioned above, programming stored by the storage medium 1104, when executed by the processing circuit 1110, causes the processing circuit 1110 to perform one or more of the various functions and/or process steps described herein. For example, the storage medium 1104 may include one or more of the code (e.g., operations) for determining that a first E-TFCI is outside a valid range 1130, the code for determining a gain factor 1132, the code for transmitting a signal 1134, the code for calculating βed 1136, and the code for determining a valid range 1138.

The processing circuit 1110 can thus provide the functionality of the gain factor determining component 818 of FIG. 8. For example, in some implementations the modules 1120, 1122, 1124, 1126, and 1128 are the gain factor determining component 818. As another example, the code 1130, 1132, 1134, 1136, and 1138 can be executed to provide the functionality of the gain factor determining component 818.

Figure 12:
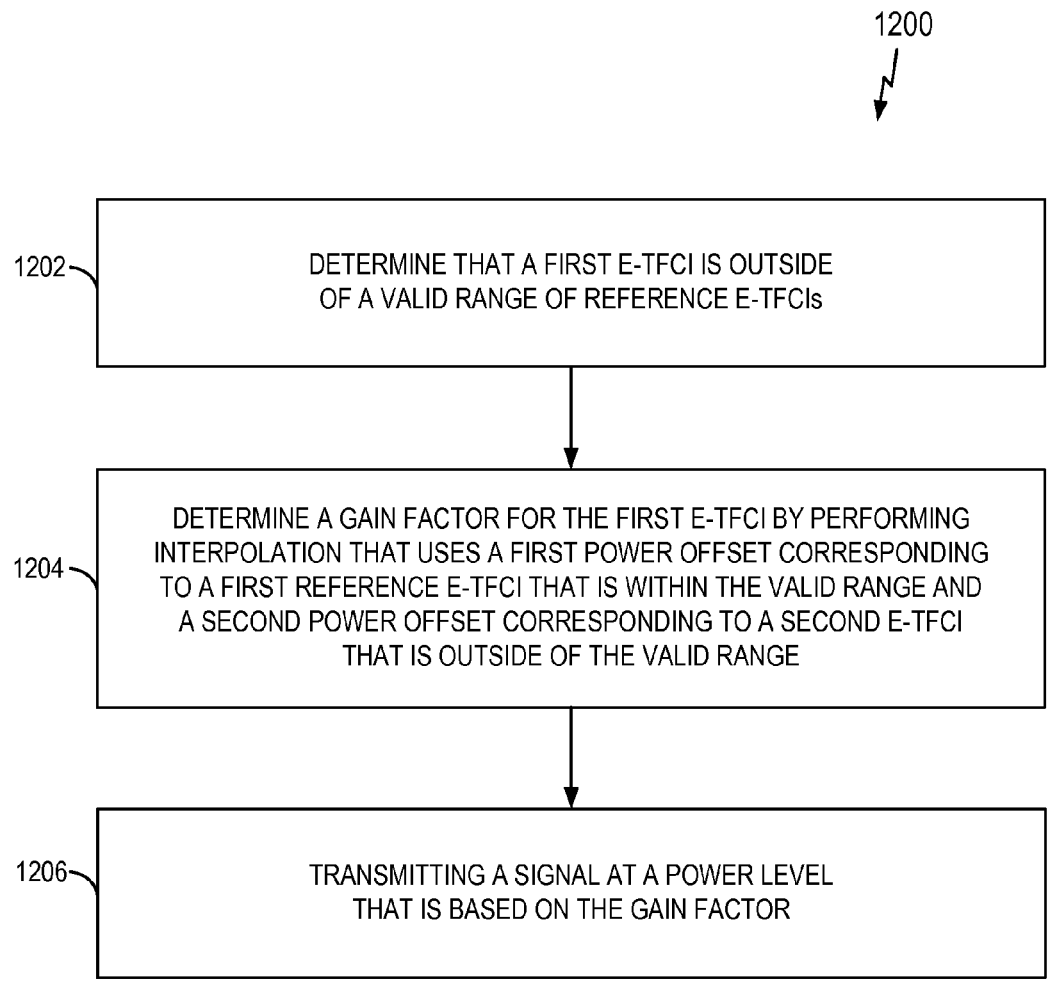
FIG. 12 is a flowchart illustrating a method of determining a gain factor and transmitting a signal based on the gain factor in accordance with some aspects of the disclosure.

FIG. 12 illustrates a process 1200 for determining a gain factor and transmitting a signal based on the gain factor in accordance with some aspects of the present disclosure. The process 1200 may take place within a processing system 1914 (FIG. 19), which may be located at an access terminal (e.g., a UE), at a base station (e.g., a Node B), or some other suitable apparatus. In another aspect, the process 1200 may be implemented by the UE 210 and/or the Node B 208 illustrated in FIG. 2. Of course, in various aspects within the scope of the present disclosure, the process 1200 may be implemented by any suitable apparatus capable of supporting transmit power control operations.

In block 1202, a determination is made that a first E-TFCI is outside of a valid range of reference E-TFCIs. For example, based on current traffic requirements and channel conditions, a UE may be allocated a particular E-TFCI. Prior to using this E-TFCI, however, the UE determines whether the E-TFCI is within a valid range of reference E-TFCIs so that the UE can determine whether to use a conventional algorithm or one of the option described herein for calculating βed for that e-TFCI. The determination of whether the first E-TFCI is outside of a valid range can be based on various factors.

In some implementations, the determination of a valid range of reference E-TFCIs is based on a maximum Allowed spreading factor supported by a UE in a given NW configuration. For example, a network may specify a maximum Allowed spreading factor to be used by a UE. However, the UE might not be able to support a higher E-TFCI when using that spreading factor. For example, due to a low spreading factor, the UE might not be able support the higher transmission rate that is associated with higher E-TFCIs. Thus, one or more of the reference E-TFCIs (e.g., $E\text{-}TFCI_{ref,4}$ and $E\text{-}TFCI_{ref,5}$) may fall outside the range of the E-TFCIs that the UE can use with the designated spreading factor.

In some implementations, the determination of the valid range of reference E-TFCIs is based on a transmit power limit for a UE. For example, in cases where the transmit power of a UE is significantly limited, the UE might not be able support the higher transmission rate that is associated with higher E-TFCIs.

In some implementations, the determination of the valid range of reference E-TFCIs is based on a valid range received from a network entity. For example, a network entity (e.g., a Node B) can send a message to a UE informing the UE of the valid range of reference E-TFCIs, given the current configuration of the UE.

In some implementations, the module for determining that a first E-TFCI is outside a valid range 1120 of FIG. 11 performs the operations of block 1202. In some implementations, the code for determining that a first E-TFCI is outside a valid range 1130 of FIG. 11 is executed to perform the operations of block 1202.

In some implementations, the module for determining a valid range 1128 of FIG. 11 performs some of the operations of block 1202. In some implementations, the code for determining a valid range 1138 of FIG. 11 is executed to perform some of the operations of block 1202.

In block 1204, a gain factor for the first E-TFCI is determined. This determination involves performing interpolation that uses a first power offset corresponding to a first reference E-TFCI that is within the valid range and a second power offset that is associated with a second E-TFCI that is outside of the valid range.

In some implementation, the gain factor determination of block 1204 is based on the first option described above. For example, the first power offset can be a reference power offset for the first reference E-TFCI, the second E-TFCI can be a second reference E-TFCI that is outside of the valid range of reference E-TFCIs, and the second power offset can be a reference power offset for the second reference E-TFCI. In addition, the gain factor can be an offset between a transmit power for a control channel and a transmit power for a data channel as discussed herein. Also, the first reference E-TFCI can be the reference E-TFCI that has the highest E-TFCI value of all reference E-TFCIs within the valid range of reference E-TFCIs.

As a specific example, a UE may determine a βed gain factor for any E-TFCI above the highest valid reference E-TFCI up to the maximum allowed E-TFCI (e.g., the maximum allowed given the current spreading factor, etc.). This determination involves using interpolation that is based on the highest valid reference E-TFCI (e.g., $E\text{-}TFCI_{ref,3}$) and the next highest (albeit, within the invalid range) reference E-TFCI (e.g., $E\text{-}TFCI_{ref,4}$). As discussed herein, this interpolation employs Equations 2 and 3 or Equations 5 and 6 in some implementations.

In some implementation, the gain factor determination of block 1204 is based on the fourth option described above. For example, the first power offset can be a reference power offset for the first reference E-TFCI and the second power offset can be a βed for the second E-TFCI. Here, the second E-TFCI can be a maximum allowed E-TFCI (e.g., the maximum allowed given the current spreading factor, etc.). As discussed above in conjunction with FIG. 7, the βed for the second E-TFCI can be calculated by performing an extrapolation operation based on the first reference E-TFCI. This extrapolation operation employs an HARQ offset equal to 0 in some cases.

As a specific example, a first gain factor for a maximum allowed E-TFCI (e.g., E-TFCI_MAX) is determined by performing extrapolation based on the highest valid reference E-TFCI (e.g., $E\text{-}TFCI_{ref,3}$). An interpolation operation is then performed between the determined first gain factor and a reference power offset for a reference E-TFCI (e.g., $E\text{-}TFCI_{ref,3}$) that is within the valid range to generate the βed gain factor for the first E-TFCI. As discussed herein, this interpolation employs a combination of Equations 1-6 in some implementations.

In some implementations, the module for determining a gain factor 1122 of FIG. 11 performs the operations of block 1204. In some implementations, the code for determining a gain factor 1132 of FIG. 11 is executed to perform the operations of block 1204.

In some implementations, the module for calculating βed 1126 of FIG. 11 performs some of the operations of block 1204. In some implementations, the code for calculating βed 1136 of FIG. 11 is executed to perform some of the operations of block 1204.

In block 1206, a signal is transmitted at a power level that is based on the gain factor determined at block 1204. For example, a UE can set a transmit power for an uplink data channel to a value that is offset from the transmit power for an uplink control channel. The value of this offset can be equal to or otherwise based on the gain factor determined at block 1204. Accordingly, the UE will transmit data on the data channel at the corresponding transmit power.

In some implementations, the module for transmitting a signal 1124 of FIG. 11 performs the operations of block 1206. In some implementations, the code for transmitting a signal 1134 of FIG. 11 is executed to perform the operations of block 1206.

Figure 13:
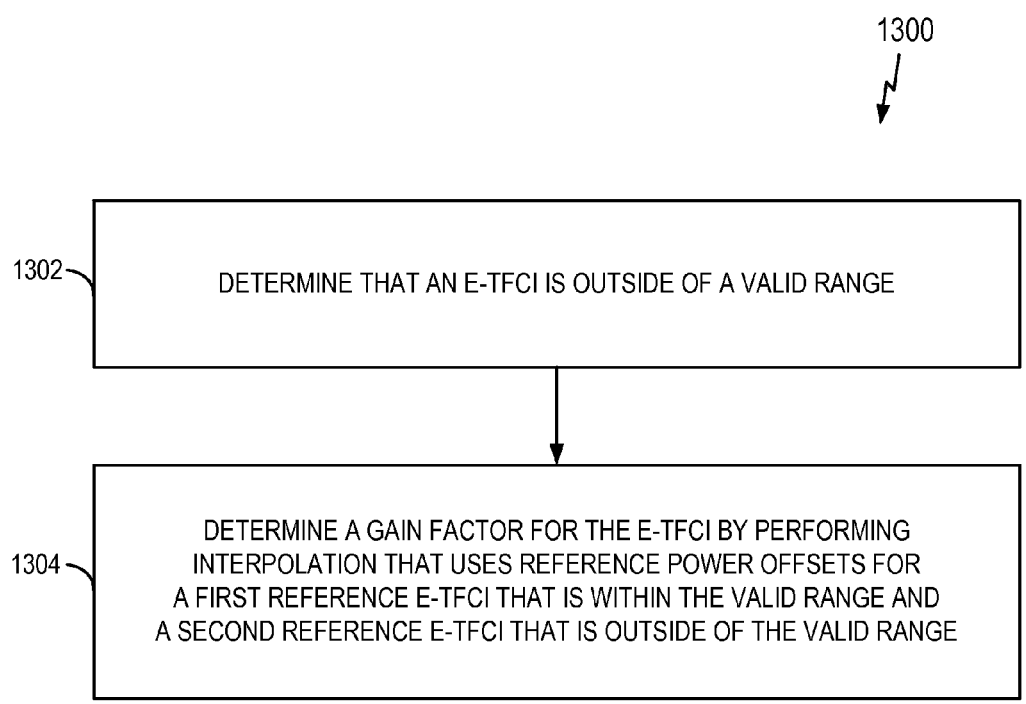
FIG. 13 is a flowchart illustrating a method of determining a gain factor in accordance with some aspects of the disclosure.

FIG. 13 illustrates a process 1300 for determining a gain factor in accordance with some aspects of the present disclosure (e.g., the first option). In some aspects, the process 1300 describes one implementation of the process 1200 of FIG. 12. The process 1300 may take place within a processing system 1914 (FIG. 19), which may be located at an access terminal (e.g., a UE), at a base station (e.g., a Node B), or some other suitable apparatus. In another aspect, the process 1300 may be implemented by the UE 210 and/or the Node B 208 illustrated in FIG. 2. Of course, in various aspects within the scope of the present disclosure, the process 1300 may be implemented by any suitable apparatus capable of supporting transmit power control operations.

In block 1302, a determination is made that an E-TFCI is outside of a valid range. The operations of block 1302 may thus correspond to the operations of block 1202 of FIG. 12 described above.

In block 1304, a gain factor for an E-TFCI is determined. This determination involves performing interpolation that uses a reference power offset for a reference E-TFCI (e.g., E-TFCI$_{ref,3}$) that is within the valid range and a reference power offset for the reference E-TFCI (e.g., E-TFCI$_{ref,4}$) that is outside of the valid range. In some implementations, the module for determining a gain factor 1122 of FIG. 11 performs the operations of block 1304. In some implementations, the code for determining a gain factor 1132 of FIG. 11 is executed to perform the operations of block 1304.

Figure 14:
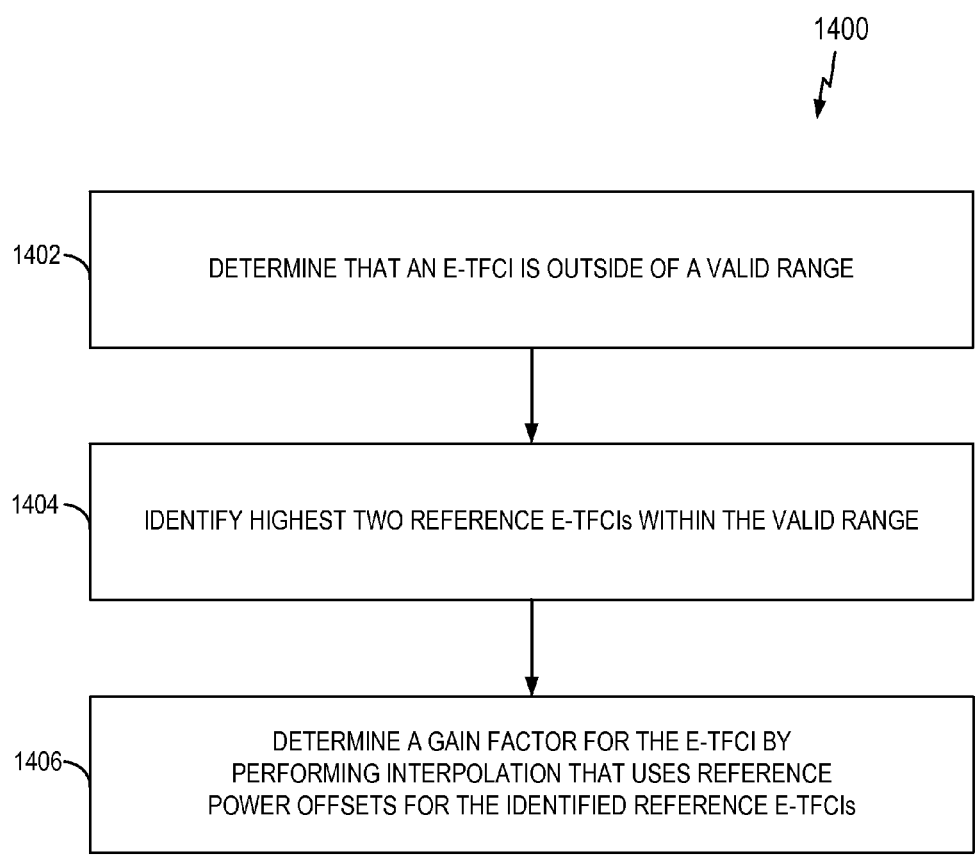
FIG. 14 is a flowchart illustrating another method of determining a gain factor in accordance with some aspects of the disclosure.

FIG. 14 illustrates a process 1400 for determining a gain factor in accordance with some aspects of the present disclosure (e.g., the second option). The process 1400 may take place within a processing system 1914 (FIG. 19), which may be located at an access terminal (e.g., a UE), at a base station (e.g., a Node B), or some other suitable apparatus. In another aspect, the process 1400 may be implemented by the UE 210 and/or the Node B 208 illustrated in FIG. 2. Of course, in various aspects within the scope of the present disclosure, the process 1400 may be implemented by any suitable apparatus capable of supporting transmit power control operations.

In block 1402, a determination is made that an E-TFCI is outside of a valid range. The operations of block 1402 may thus correspond to the operations of block 1202 of FIG. 12 described above.

In block 1404, the two highest reference E-TFCIs within the valid range are determined. For example, a UE may identify E-TFCI$_{ref,2}$ and E-TFCI$_{ref,3}$ at this point. In some implementations, the module for determining a gain factor 1122 of FIG. 11 performs the operations of block 1404. In some implementations, the code for determining a gain factor 1132 of FIG. 11 is executed to perform the operations of block 1404.

In block 1406, a gain factor for an E-TFCI is determined. This determination involves performing interpolation that uses reference power offsets for the reference E-TFCIs identified at block 1404. In some implementations, the module for determining a gain factor 1122 of FIG. 11 performs the operations of block 1406. In some implementations, the code for determining a gain factor 1132 of FIG. 11 is executed to perform the operations of block 1406.

Figure 15:
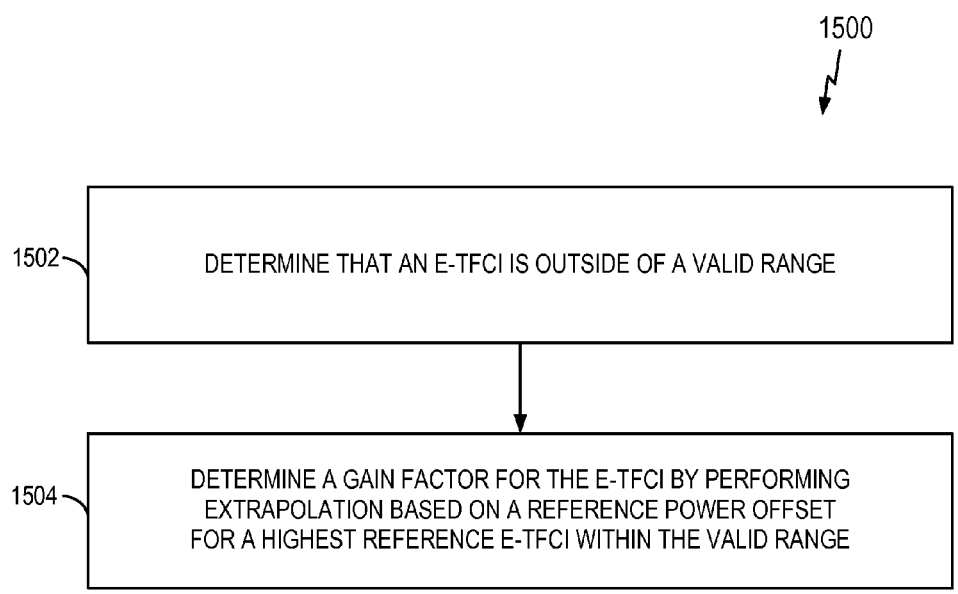
FIG. 15 is a flowchart illustrating another method of determining a gain factor in accordance with some aspects of the disclosure.

FIG. 15 illustrates a process 1500 for determining a gain factor in accordance with some aspects of the present disclosure (e.g., the third option). The process 1500 may take place within a processing system 1914 (FIG. 19), which may be located at an access terminal (e.g., a UE), at a base station (e.g., a Node B), or some other suitable apparatus. In another aspect, the process 1500 may be implemented by the UE 210 and/or the Node B 208 illustrated in FIG. 2. Of course, in various aspects within the scope of the present disclosure, the process 1500 may be implemented by any suitable apparatus capable of supporting transmit power control operations.

In block 1502, a determination is made that an E-TFCI is outside of a valid range. The operations of block 1502 may thus correspond to the operations of block 1202 of FIG. 12 described above.

In block 1504, a gain factor for an E-TFCI is determined. This determination involves performing extrapolation based on a reference power offset for a highest E-TFCI (e.g., E-TFCI$_{ref,3}$) within the valid range. In some implementations, the module for determining a gain factor 1122 of FIG. 11 performs the operations of block 1504. In some implementations, the code for determining a gain factor 1132 of FIG. 11 is executed to perform the operations of block 1504.

Figure 16:
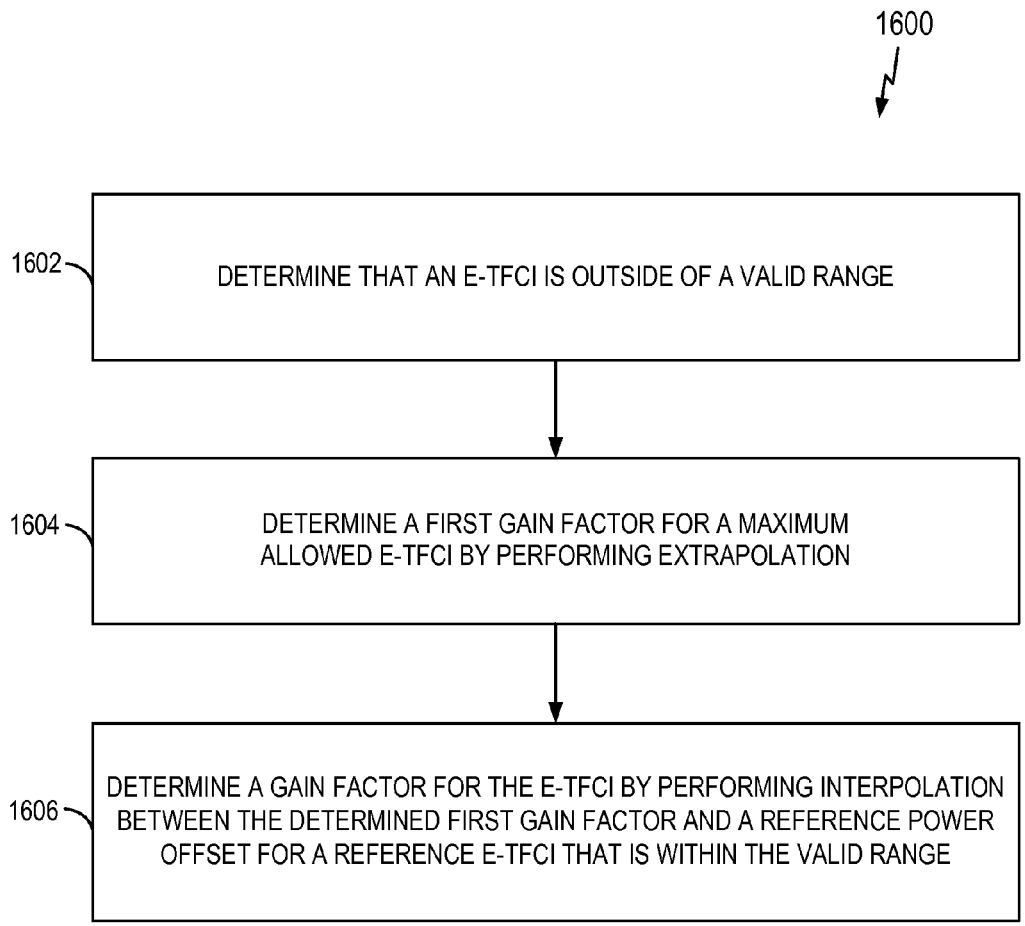
FIG. 16 is a flowchart illustrating another method of determining a gain factor in accordance with some aspects of the disclosure.

FIG. 16 illustrates a process 1600 for determining a gain factor in accordance with some aspects of the present disclosure (e.g., the fourth option). In some aspects, the process 1600 describes one implementation of the process 1200 of FIG. 12. The process 1600 may take place within a processing system 1914 (FIG. 19), which may be located at an access terminal (e.g., a UE), at a base station (e.g., a Node B), or some other suitable apparatus. In another aspect, the process 1600 may be implemented by the UE 210 and/or the Node B 208 illustrated in FIG. 2. Of course, in various aspects within the scope of the present disclosure, the process 1600 may be implemented by any suitable apparatus capable of supporting transmit power control operations.

In block 1602, a determination is made that an E-TFCI is outside of a valid range. The operations of block 1602 may thus correspond to the operations of block 1202 of FIG. 12 described above.

In block 1604, a first gain factor for a maximum allowed E-TFCI (e.g., E-TFCI_MAX) is determined by performing extrapolation. As described herein, this extrapolation could use Equation 1, Equation 4, or some other suitable algorithm. In some implementations, the module for determining a gain factor 1122 of FIG. 11 performs the operations of block 1604. In some implementations, the code for determining a gain factor 1132 of FIG. 11 is executed to perform the operations of block 1604. In some implementations, the module for calculating βed 1126 of FIG. 11 performs the operations of block 1604. In some implementations, the code for calculating βed 1136 of FIG. 11 is executed to perform the operations of block 1604.

In block 1606, a gain factor for an E-TFCI is determined. This determination involves performing interpolation between the first gain factor determined at block 1604 and a reference power offset for a reference E-TFCI (e.g., E-TFCI$_{ref,3}$) that is within the valid range. In some implementations, the module for determining a gain factor 1122 of FIG. 11 performs the operations of block 1606. In some implementations, the code for determining a gain factor 1132 of FIG. 11 is executed to perform the operations of block 1606.

Figure 17:
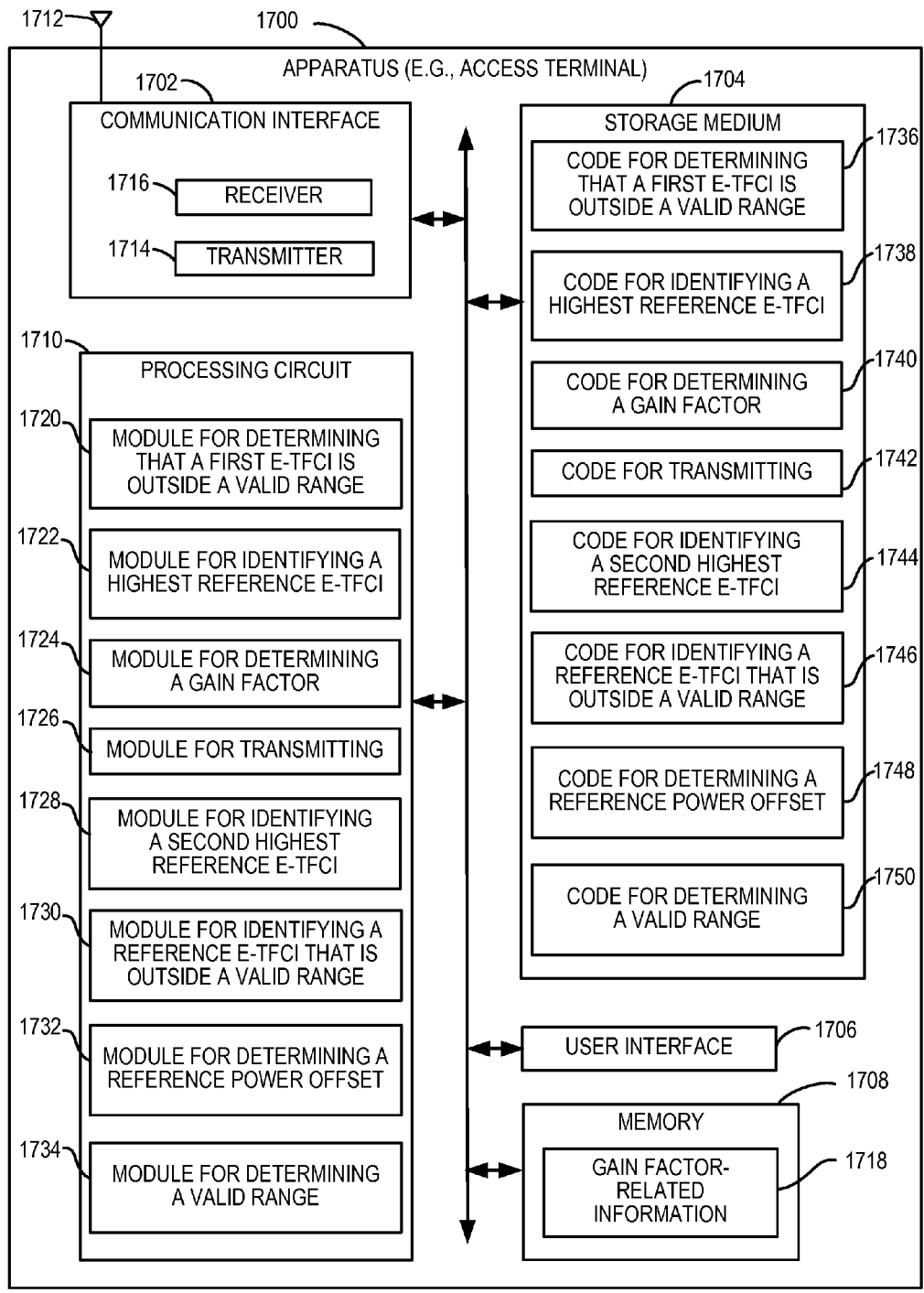
FIG. 17 is a block diagram illustrating select components of an apparatus configured to determine a gain factor in accordance with some aspects of the disclosure.

FIG. 17 is an illustration of an apparatus 1700 (e.g., an access terminal) configured according to one or more aspects of the disclosure. The apparatus 1700 includes a communication interface 1702, a storage medium 1704, a user interface 1706, a memory 1708, and a processing circuit 1710. These components can be coupled to and/or placed in electrical communication with one another via a signaling bus or other suitable component. In particular, each of the communication interface 1702, the storage medium 1704, the user interface 1706, and the memory 1708 are coupled to and/or in electrical communication with the processing circuit 1710.

The communication interface 1702 may be adapted to facilitate wireless communication of the apparatus 1700. For example, the communication interface 1702 may include circuitry and/or programming adapted to facilitate the communication of information bi-directionally with respect to one or more communication devices in a network. The communication interface 1702 may be coupled to one or more antennas 1712 for wireless communication within a wireless communication system. The communication interface 1702 can be configured with one or more standalone receivers and/or transmitters, as well as one or more transceivers. In the illustrated example, the communication interface 1702 includes a transmitter 1714 and a receiver 1716.

The memory 1708 may represent one or more memory devices. As indicated, the memory 1708 may store gain factor-related information 1718 along with other information used by the apparatus 1700. In some implementations, the memory 1708 and the storage medium 1704 are implemented as a common memory component. The memory 1708 may also be used for storing data that is manipulated by the processing circuit 1710 or some other component of the apparatus 1700.

The processing circuit 1710, as well as any of its modules 1720-1734, may be arranged to obtain, process and/or send data, control data access and storage, issue commands, and control other desired operations. The processing circuit 1710, as well as any of its modules 1720-1734, may include circuitry configured to perform a desired function and/or implement desired programming provided by appropriate media. The processing circuit 1710, as well as any of its modules 1720-1734, may be implemented and/or configured according to any of the examples of the processing circuit 1110 and modules 1120-1128 described above.

According to at least one example of the apparatus 1700, the processing circuit 1710 may include one or more of a module for determining that a first E-TFCI is outside a valid range 1720, a module for identifying a highest reference E-TFCI 1722, a module for determining a gain factor 1724, a module for transmitting 1726, a module for identifying a second highest reference E-TFCI 1728, a module for identifying a reference E-TFCI that is outside a valid range 1730, a module for determining a reference power offset 1732, or a module for determining a valid range 1734.

The module for determining that a first E-TFCI is outside a valid range 1720 may include circuitry and/or programming adapted to perform several functions relating to, for example, determining whether an E-TFCI associated with a transmission is outside of a range associated with valid reference E-TFCIs. For example, the module for determining that a first E-TFCI is outside a valid range 1720 obtains a designated E-TFCI (e.g., directly from a component that determines the E-TFCI or from the memory 1708). In addition, the module for determining that a first E-TFCI is outside a valid range 1720 obtains an indication of the valid range (e.g., directly from a component that determines the range or from the memory 1708). The module for determining that a first E-TFCI is outside a valid range 1720 then determines whether the E-TFCI is within the range or outside the range. The module for determining that a first E-TFCI is outside a valid range 1720 outputs an indication of whether the E-TFCI is outside the range for access by another component of the processing circuit 1710 or some other component of the apparatus 1700. For example, the module for determining that a first E-TFCI is outside a valid range 1720 can pass this indication to another component of the apparatus 1700 or store acquired information in the memory 1708. In some implementations, the programming referred to above includes code for determining that a first E-TFCI is outside a valid range 1736 stored on the storage medium 1704.

The module for identifying a highest reference E-TFCI 1722 may include circuitry and/or programming adapted to perform several functions relating to, for example, identifying the highest reference E-TFCI that is within a valid range of reference E-TFCIs. For example, the module for identifying a highest reference E-TFCI 1722 obtains a list of reference E-TFCIs (e.g., from the memory 1708). In addition, the module for identifying a highest reference E-TFCI 1722 obtains an indication of the valid range (e.g., directly from a component that determines the range or from the memory 1708). The module for identifying a highest reference E-TFCI 1722 then identifies the highest E-TFCI that is within the range. The module for identifying a highest reference E-TFCI 1722 outputs an indication of the highest valid E-TFCI for access by another component of the processing circuit 1710 or some other component of the apparatus 1700. For example, the module for identifying a highest reference E-TFCI range 1722 can pass this indication to another component of the apparatus 1700 or store this indication in the memory 1708. In some implementations, the programming referred to above includes code for identifying a highest reference E-TFCI 1738 stored on the storage medium 1704.

The module for determining a gain factor 1724 may include circuitry and/or programming adapted to perform several functions relating to, for example, generating a gain factor based on input information. Initially, the module for determining a gain factor 1724 obtains the input information (e.g., passed from another component of the apparatus 1700 such as the receiver 1716 or the memory 1708). In some implementations, the input information includes at least one reference E-TFCI, channel information, and block size information. In some implementations, the module for determining a gain factor 1724 implements an algorithm that operates on the input information to generate a gain factor. For example, in some implementations, the module for determining a gain factor 1724 performs operations according to one or more of the first option, the second option, the third option, the fourth option, Equation 1, Equation 2, Equation 3, Equation 4, Equation 5, or Equation 6 as discussed herein. The module for determining a gain factor 1724 then outputs an indication of the determined gain factor. For example, the module for determining a gain factor 1724 can pass the indication to another component of the apparatus 1700 or store the indication in the memory 1708. In some implementations, the programming referred to above includes code for determining a gain factor 1740 stored on the storage medium 1704.

The module for transmitting a signal 1726 may include circuitry and/or programming adapted to perform several functions relating to, for example, transmitting at a transmit power that is based on a gain factor. Initially, the module for transmitting a signal 1726 obtains data to be transmitted. For example, the module for transmitting a signal 1726 may obtain this data directly from a component of the apparatus (e.g., the memory 1708 or some other component). In some implementations, the module for transmitting a signal 1726 processes (e.g., encodes) the data to be transmitted. The module for transmitting a signal 1726 then causes the data to be transmitted at a power level that is based on the gain factor (e.g., obtained from the module 1724 or from the memory 1708). For example, the module for transmitting a signal 1726 can pass the data to the transmitter 1714. In some implementations, the programming referred to above includes code for transmitting a signal 1742 stored on the storage medium 1704.

The module for identifying a second highest reference E-TFCI 1728 may include circuitry and/or programming adapted to perform several functions relating to, for example, identifying the second highest reference E-TFCI that is within a valid range of reference E-TFCIs. For example, the module for identifying a second highest reference E-TFCI 1728 obtains a list of reference E-TFCIs (e.g., from the memory 1708). In addition, the module for identifying a second highest reference E-TFCI 1728 obtains an indication of the valid range (e.g., directly from a component that determines the range or from the memory 1708). The module for identifying a second highest reference E-TFCI 1728 then identifies the second highest E-TFCI that is within the range. The module for identifying a second highest reference E-TFCI 1728 outputs an indication of the second highest valid E-TFCI for access by another component of the processing circuit 1710 or some other component of the apparatus 1700. For example, the module for identifying a second highest reference E-TFCI range 1728 can pass this indication to another component of the apparatus 1700 or store this indication in the memory 1708. In some implementations, the programming referred to above includes code for identifying a second highest reference E-TFCI 1744 stored on the storage medium 1704.

The module for identifying a reference E-TFCI that is outside a valid range 1730 may include circuitry and/or programming adapted to perform several functions relating to, for example, identifying a reference E-TFCI that is not within a valid range of reference E-TFCIs. For example, the module for identifying a reference E-TFCI that is outside a valid range 1730 obtains a list of reference E-TFCIs (e.g., from the memory 1708). In addition, the module for identifying a reference E-TFCI that is outside a valid range 1730 obtains an indication of the valid range (e.g., directly from a component that determines the range or from the memory 1708). The module for identifying a reference E-TFCI that is outside a valid range 1730 then identifies a reference E-TFCI that is not within the range. In some scenarios, the lowest reference E-TFCI that is outside the valid range is identified here. The module for identifying a reference E-TFCI that is outside a valid range 1730 outputs an indication of the reference E-TFCI for access by another component of the processing circuit 1710 or some other component of the apparatus 1700. For example, the module for identifying a reference E-TFCI that is outside a valid range 1730 can pass this indication to another component of the apparatus 1700 or store this indication in the memory 1708. In some implementations, the programming referred to above includes code for identifying a reference E-TFCI that is outside a valid range 1746 stored on the storage medium 1704.

The module for determining a reference power offset 1732 may include circuitry and/or programming adapted to perform several functions relating to, for example, determining a reference power offset associated with a reference e-TFCI. Initially, the module for determining a reference power offset 1732 obtains an indication of the reference E-TFCI (e.g., passed from another component of the apparatus 1700 such as the receiver 1716 or the memory 1708). In some scenarios, the reference E-TFCI is the highest reference E-TFCI that is within a valid range of E-TFCIs. The module for determining a reference power offset 1732 implements an algorithm or performs a table lookup to determine the reference power offset for this reference E-TFCI. The module for determining a reference power offset 1732 then outputs an indication of the determined reference power offset. For example, the module for determining a reference power offset 1732 can pass the indication to another component of the apparatus 1700 or store the indication in the memory 1708. In some implementations, the programming referred to above includes code for determining a reference power offset 1748 stored on the storage medium 1704.

Finally, the module for determining a valid range 1734 may include circuitry and/or programming adapted to perform several functions relating to, for example, determining a valid range for E-TFCIs and/or reference E-TFCIs. Initially, the module for determining a valid range 1734 acquires information that may affect the valid range (e.g., from the memory 1708 or directly from another module). For example, this information may relate to one or more of a spreading factor, a puncturing limit, or MRAB as discussed herein. The module for determining a valid range 1734 then processes this information to determine whether the E-TFCIs are limited. The module for determining a valid range 1734 then outputs an indication of the valid range. For example, the module for determining a valid range 1734 can pass the indication to another component of the apparatus 1700 or store the indication in the memory 1708. In some implementations, the programming referred to above includes code for determining a valid range 1750 stored on the storage medium 1704.

The storage medium 1704 may represent one or more processor-readable devices for storing programming, such as processor executable code or instructions (e.g., software, firmware), electronic data, databases, or other digital information. The storage medium 1704 may be configured and/or implemented in a manner similar to the storage medium 1104 described above.

The storage medium 1704 may be coupled to the processing circuit 1710 such that the processing circuit 1710 can read information from, and write information to, the storage medium 1704. That is, the storage medium 1704 can be coupled to the processing circuit 1710 so that the storage medium 1704 is at least accessible by the processing circuit 1710, including examples where the storage medium 1704 is integral to the processing circuit 1710 and/or examples where the storage medium 1704 is separate from the processing circuit 1710.

Like the storage medium 1104, the storage medium 1704 includes programming stored thereon. The programming stored by the storage medium 1704, when executed by the processing circuit 1710, causes the processing circuit 1710 to perform one or more of the various decoding functions and/or process steps described herein. For example, the storage medium 1704 may include one or more of the code (e.g., operations) for determining that a first E-TFCI is outside a valid range 1736, code for identifying a highest reference E-TFCI 1738, code for determining a gain factor 1740, code for transmitting 1742, code for identifying a second highest reference E-TFCI 1744, code for identifying a reference E-TFCI that is outside a valid range 1746, code for determining a reference power offset 1748, or code for determining a valid range 1750.

Thus, according to one or more aspects of the present disclosure, the processing circuit 1710 is adapted to perform (in conjunction with the storage medium 1704) any or all of the decoding processes, functions, steps and/or routines for any or all of the apparatuses described herein. As used herein, the term "adapted" in relation to the processing circuit 1710 may refer to the processing circuit 1710 being one or more of configured, employed, implemented, and/or programmed (in conjunction with the storage medium 1704) to perform a particular process, function, step and/or routine according to various features described herein.

The processing circuit 1710 can thus provide the functionality of the gain factor determining component 824 of FIG. 8. For example, in some implementations, the modules 1720, 1722, 1724, 1726, 1728, 1730, 1732, and 1734 are the gain factor determining component 824. As another example, the code 1736, 1738, 1740, 1742, 1744, 1746, 1748, and 1750 can be executed to provide the functionality of the gain factor determining component 824.

Figure 18:
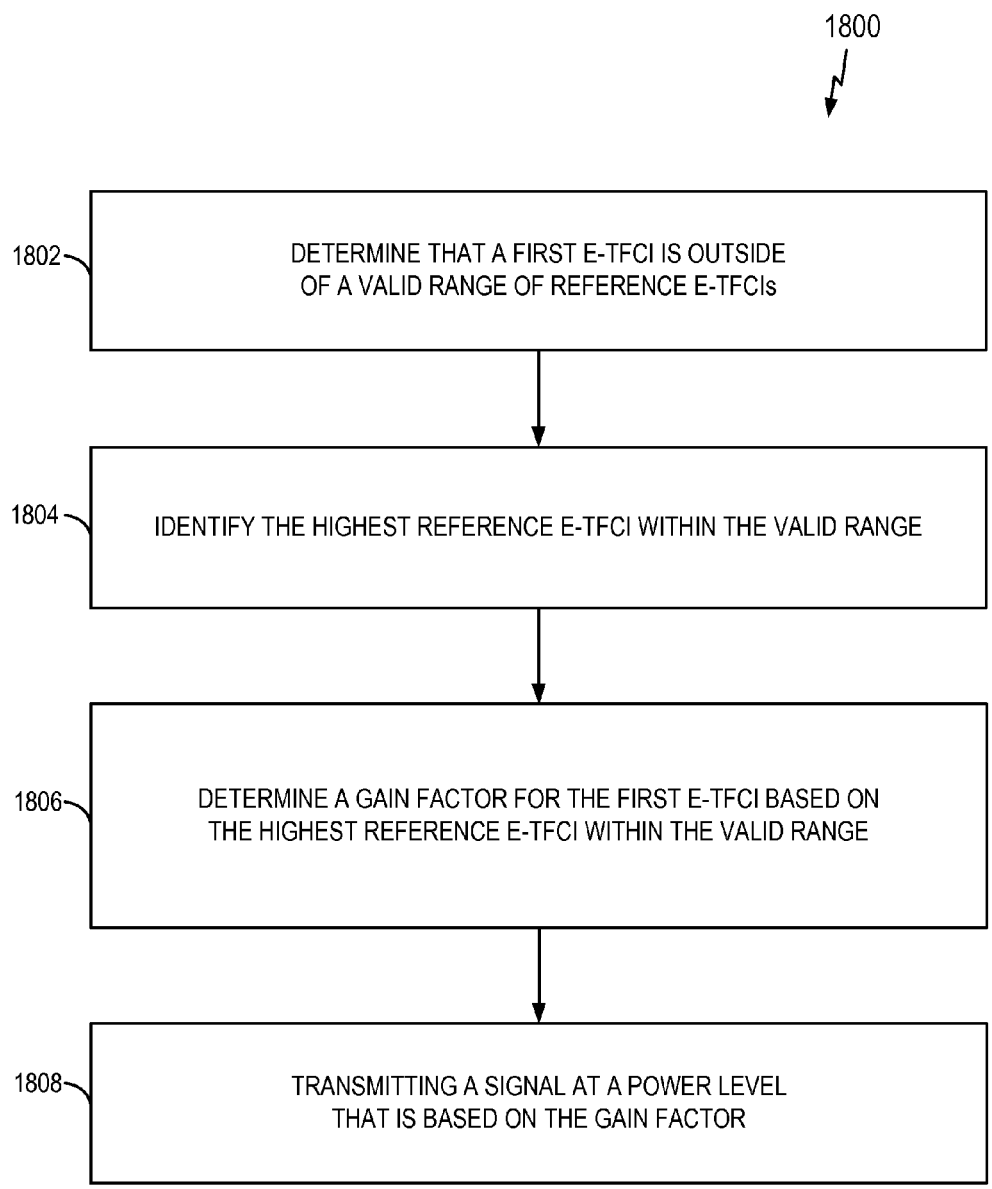
FIG. 18 is a flowchart illustrating a method of determining a gain factor and transmitting a signal based on the gain factor in accordance with some aspects of the disclosure.

FIG. 18 illustrates a process 1800 for determining a gain factor and transmitting a signal based on the gain factor in accordance with some aspects of the present disclosure. The process 1800 may take place within a processing system 1914 (FIG. 19), which may be located at an access terminal (e.g., a UE), at a base station (e.g., a Node B), or some other suitable apparatus. In another aspect, the process 1800 may be implemented by the UE 210 and/or the Node B 208 illustrated in FIG. 2. Of course, in various aspects within the scope of the present disclosure, the process 1800 may be implemented by any suitable apparatus capable of supporting transmit power control operations.

In block 1802, a determination is made that a first E-TFCI for HSUPA is outside of a valid range of reference E-TFCIs. For example, based on current traffic requirements and channel conditions, a UE may be allocated a particular E-TFCI. Prior to using this E-TFCI, however, the UE determines whether the E-TFCI is within a valid range of reference E-TFCIs so that the UE can determine whether to use a conventional algorithm or one of the option described herein for calculating βed for that e-TFCI. The determination of whether the first E-TFCI is outside of a valid range can be based on various factors as discussed herein.

In some implementations, the module for determining that a first E-TFCI is outside a valid range 1720 of FIG. 17 performs the operations of block 1802. In some implementations, the code for determining that a first E-TFCI is outside a valid range 1736 of FIG. 17 is executed to perform the operations of block 1802.

Also, the valid range may be determined prior to or in conjunction with the operations of block 1802. As discussed herein, the determination of the valid range of reference E-TFCIs may be based on at least one of: a channelisation code allocated for an access terminal, a transmit power limit for an access terminal, a spreading factor supported by an access terminal, or a valid range received from a network entity.

Thus, in some implementations, the module for determining a valid range 1734 of FIG. 17 performs operations associated with block 1802. In some implementations, the code for determining a valid range 1750 of FIG. 17 is executed to perform operations associated with block 1802.

In block 1804, a highest reference E-TFCI within the valid range is determined. In the examples of FIGS. 4-7, E-TFCI 3 is identified as the highest reference E-TFCI.

In some implementations, the module for identifying a highest reference E-TFCI 1722 of FIG. 17 performs the operations of block 1804. In some implementations, the code for identifying a highest reference E-TFCI 1738 of FIG. 17 is executed to perform the operations of block 1804.

In block 1806, a gain factor for the first E-TFCI is determined. In some aspects, the gain factor may comprise an offset between a transmit power for a control channel and a transmit power for a data channel. In some aspects, the gain factor may comprise βed.

In some implementations, the module for determining a gain factor 1724 of FIG. 17 performs the operations of block 1806. In some implementations, the code for determining a gain factor 1740 of FIG. 17 is executed to perform the operations of block 1804.

The determination of block 1806 is based on the highest reference E-TFCI identified at block 1804. The manner in which the gain factor is determined (e.g., calculated) depends on whether the process 1800 implements the first option, the second option, the third option, or the fourth option described above.

In implementations where the gain factor determination of block 1806 is based on the first option described above, a reference E-TFCI (e.g., E-TFCI 4 in FIG. 4) that is outside the valid range is identified. In this case, the determination of the gain factor for the first E-TFCI is further based on the reference E-TFCI that is outside of the valid range. For example, the determination of the gain factor for the first E-TFCI may comprise performing interpolation that uses the highest reference E-TFCI within the valid range and the reference E-TFCI that is outside of the valid range. In some cases, the reference E-TFCI that is outside of the valid range is higher than the first E-TFCI.

As a specific example, a UE may determine a βed gain factor for any E-TFCI above the highest valid reference E-TFCI up to the maximum allowed E-TFCI (e.g., the maximum allowed given the current spreading factor, etc.). This determination involves using interpolation that is based on the highest valid reference E-TFCI (e.g., $E\text{-}TFCI_{ref,3}$) and the next highest (albeit, within the invalid range) reference E-TFCI (e.g., $E\text{-}TFCI_{ref,4}$). As discussed herein, this interpolation employs Equations 2 and 3 or Equations 5 and 6 in some implementations.

In some implementations, the module for identifying a reference E-TFCI that is outside a valid range 1724 of FIG. 17 performs operations associated with block 1806. In some implementations, the code for identifying a reference E-TFCI that is outside a valid range 1746 of FIG. 17 is executed to perform operations associated with block 1806.

In implementations where the gain factor determination of block 1806 is based on the second option described above, the second highest reference E-TFCI (e.g., E-TFCI 2 in FIG. 5) that is within the valid range is identified. In this case, the determination of the gain factor for the first E-TFCI is further based on the second highest reference E-TFCI that is within the valid range. For example, the determination of the gain factor for the first E-TFCI may comprise performing interpolation that uses the highest and second highest reference E-TFCIs within the valid range.

In some implementations, the module for identifying a second highest reference E-TFCI 1728 of FIG. 17 performs operations associated with block 1806. In some implementations, the code for identifying a second highest reference E-TFCI 1744 of FIG. 17 is executed to perform operations associated with block 1806.

In implementations where the gain factor determination of block 1806 is based on the third option described above, extrapolation is performed on the highest reference E-TFCI (e.g., E-TFCI 3 in FIG. 6) that is within the valid range. As illustrated in FIG. 6, an E-TFCI value that is higher than the highest valid reference E-TFCI may therefore be determined.

In implementations where the gain factor determination of block 1804 is based on the fourth option described above, both interpolation and extrapolation operations are performed. As discussed above in conjunction with FIG. 7, the gain factor for the maximum allowed E-TFCI can be determined by performing an extrapolation operation that uses the highest reference E-TFCI within the valid range. This extrapolation operation employs an HARQ offset equal to 0 in some cases. Extrapolation is then performed based on the gain factor for the maximum allowed E-TFCI. For example, a reference power offset for the highest reference E-TFCI within the valid range can be determined, whereby the interpolation is further based on the reference power offset.

As a specific example, a first gain factor for a maximum allowed E-TFCI (e.g., E-TFCI_MAX) is determined by performing extrapolation based on the highest valid reference E-TFCI (e.g., E-TFCI$_{ref,3}$). An interpolation operation is then performed between the determined first gain factor and a reference power offset for a reference E-TFCI (e.g., E-TFCI$_{ref,3}$) that is within the valid range to generate the βed gain factor for the first E-TFCI.

In some implementations, the module for determining a reference power offset 1732 of FIG. 17 performs operations associated with block 1806. In some implementations, the code for determining a reference power offset 1748 of FIG. 17 is executed to perform operations associated with block 1806.

In block 1808, a signal is transmitted at a power level that is based on the gain factor determined at block 1806. For example, a UE can set a transmit power for an uplink data channel to a value that is offset from the transmit power for an uplink control channel. The value of this offset can be equal to or otherwise based on the gain factor determined at block 1806. Accordingly, the UE will transmit data on the data channel at the corresponding transmit power.

In some implementations, the module for transmitting a signal 1726 of FIG. 17 performs the operations of block 1808. In some implementations, the code for transmitting a signal 1742 of FIG. 17 is executed to perform the operations of block 1808.

Figure 19:
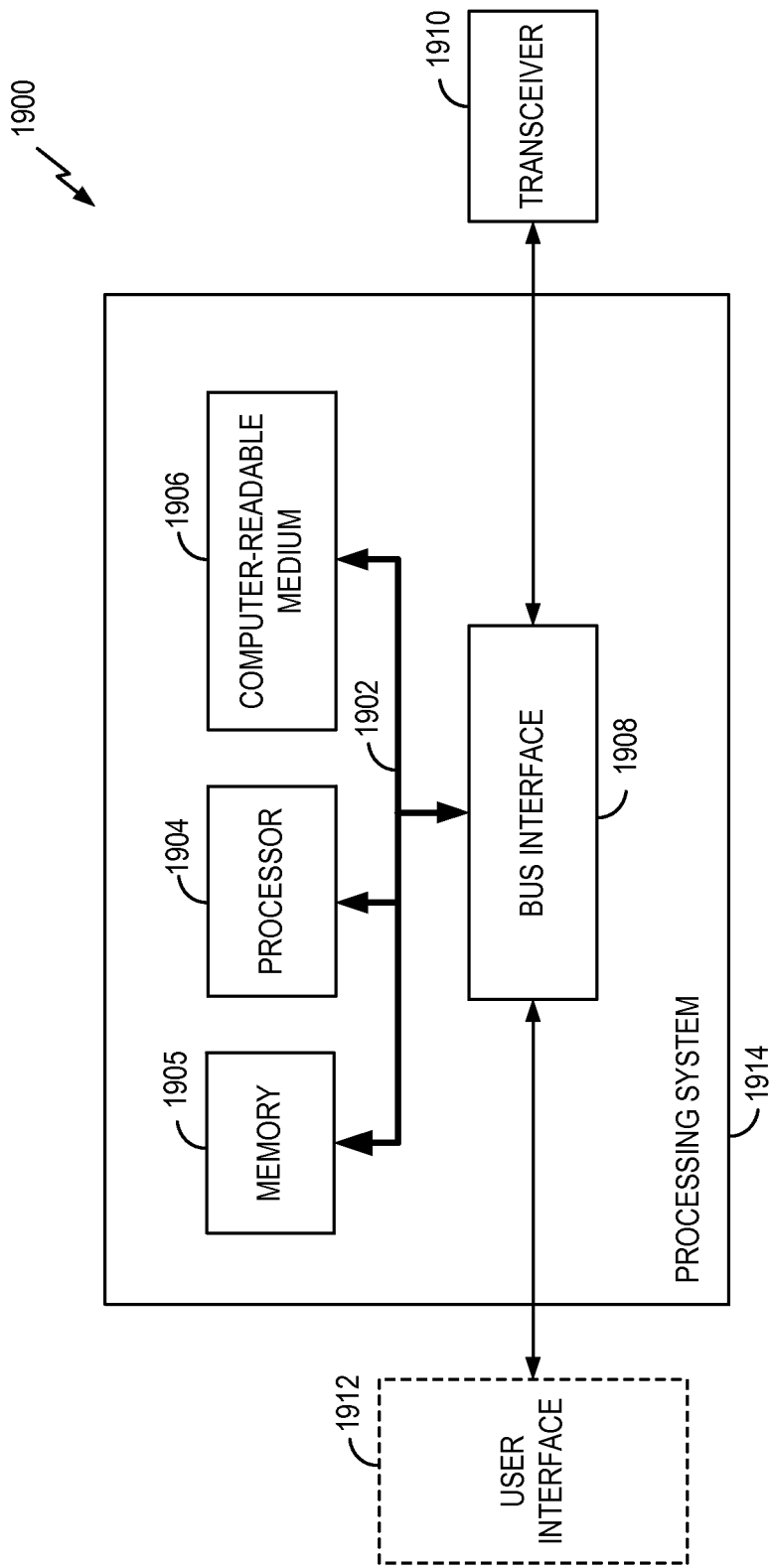
FIG. 19 is a block diagram illustrating an example of a hardware implementation for an apparatus employing a processing system.

FIG. 19 is a conceptual diagram illustrating an example of a hardware implementation for an apparatus 1900 employing a processing system 1914. In accordance with various aspects of the disclosure, an element, or any portion of an element, or any combination of elements disclosed herein may be implemented with a processing system 1914 that includes one or more processors 1904. For example and without limitation, the apparatus 1900 may be a user equipment (UE) as illustrated in any one or more of FIG. 1, 2, or 20. The processor 1904, as utilized in an apparatus 1900, may be used to implement any one or more of the processes described herein and illustrated, for example, in FIG. 10, 12-16, or 18.

In this example, the processing system 1914 may be implemented with a bus architecture, represented generally by the bus 1902. The bus 1902 may include any number of interconnecting buses and bridges depending on the specific application of the processing system 1914 and the overall design constraints. The bus 1902 links together various circuits including one or more processors (represented generally by the processor 1904), a memory 1905, and computer-readable media (represented generally by the computer-readable medium 1906). The bus 1902 may also link various other circuits such as timing sources, peripherals, voltage regulators, and power management circuits, which are well known in the art, and therefore, will not be described any further. A bus interface 1908 provides an interface between the bus 1902 and a transceiver 1910. The transceiver 1910 provides a means for communicating with various other apparatus over a transmission medium. Depending upon the nature of the apparatus, a user interface 1912 (e.g., keypad, display, speaker, microphone, joystick) may also be provided.

The processor 1904 is responsible for managing the bus 1902 and general processing, including the execution of software stored on the computer-readable medium 1906. The software, when executed by the processor 1904, causes the processing system 1914 to perform the various functions described below for any particular apparatus. The computer-readable medium 1906 may also be used for storing data that is manipulated by the processor 1904 when executing software.

Figure 20:
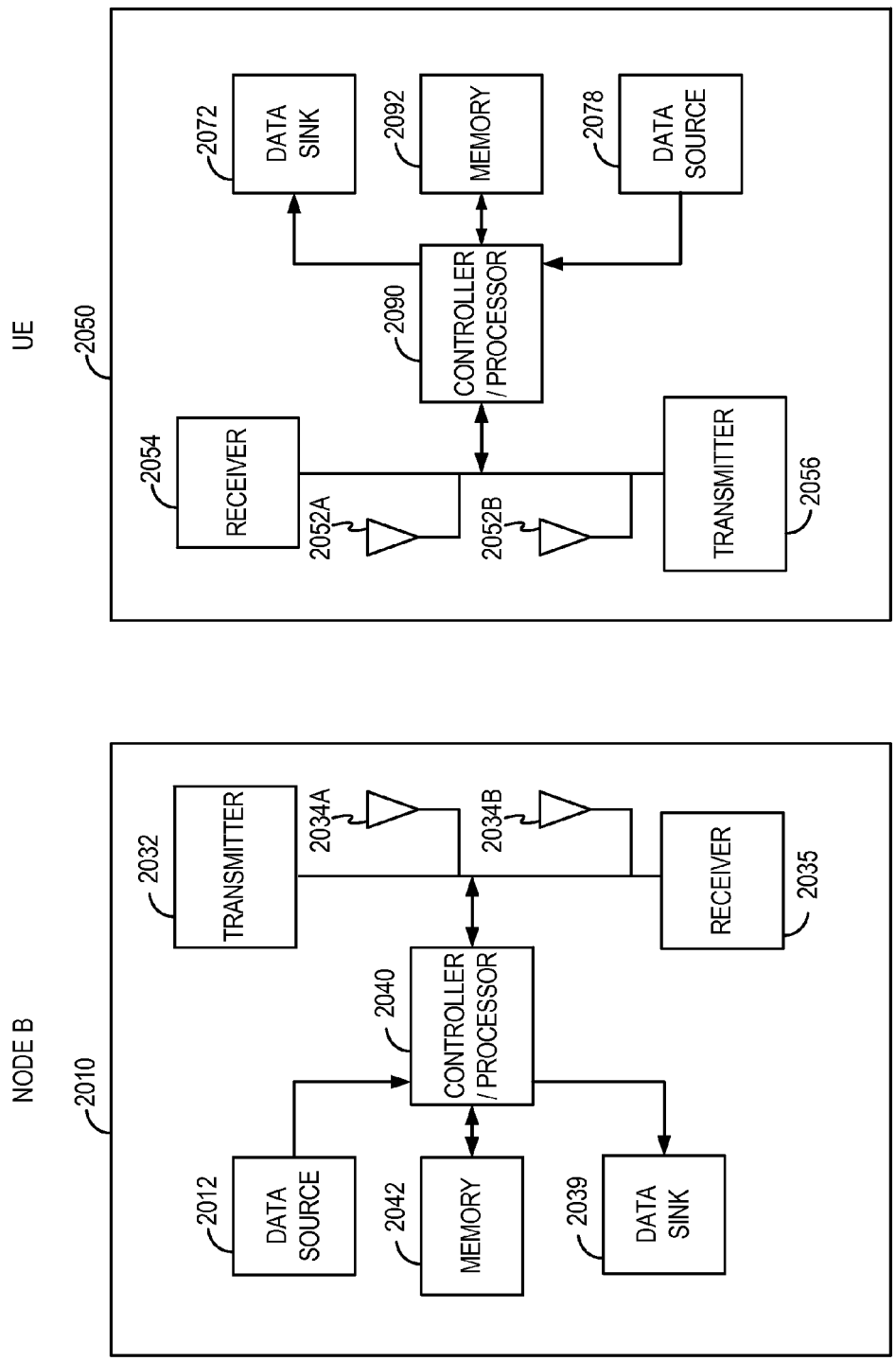
FIG. 20 is a block diagram illustrating an example of a base station in communication with an access terminal in a communication network.

FIG. 20 is a block diagram of an exemplary Node B 2010 in communication with an exemplary UE 2050, where the Node B 2010 may be the Node B 208 in FIG. 2, and the UE 2050 may be the UE 210 in FIG. 2. In the downlink communication, a controller or processor 2040 may receive data from a data source 2012. Channel estimates may be used by a controller/processor 2040 to determine the coding, modulation, spreading, and/or scrambling schemes for the transmit processor 2020. These channel estimates may be derived from a reference signal transmitted by the UE 2050 or from feedback from the UE 2050. A transmitter 2032 may provide various signal conditioning functions including amplifying, filtering, and modulating frames onto a carrier for downlink transmission over a wireless medium through one or more antennas 2034. The antennas 2034 may include one or more antennas, for example, including beam steering bidirectional adaptive antenna arrays, MIMO arrays, or any other suitable transmission/reception technologies.

At the UE 2050, a receiver 2054 receives the downlink transmission through one or more antennas 2052 and processes the transmission to recover the information modulated onto the carrier. The information recovered by the receiver 2054 is provided to a controller/processor 2090. The processor 2090 descrambles and despreads the symbols, and determines the most likely signal constellation points transmitted by the Node B 2010 based on the modulation scheme. These soft decisions may be based on channel estimates computed by the processor 2090. The soft decisions are then decoded and deinterleaved to recover the data, control, and reference signals. The CRC codes are then checked to determine whether the frames were successfully decoded. The data carried by the successfully decoded frames will then be provided to a data sink 2072, which represents applications running in the UE 2050 and/or various user interfaces (e.g., display). Control signals carried by successfully decoded frames will be provided to a controller/processor 2090. When frames are unsuccessfully decoded, the controller/processor 2090 may also use an acknowledgement (ACK) and/or negative acknowledgement (NACK) protocol to support retransmission requests for those frames.

In the uplink, data from a data source 2078 and control signals from the controller/processor 2090 are provided. The data source 2078 may represent applications running in the UE 2050 and various user interfaces (e.g., keyboard). Similar to the functionality described in connection with the downlink transmission by the Node B 2010, the processor 2090 provides various signal processing functions including CRC codes, coding and interleaving to facilitate FEC, mapping to signal constellations, spreading with OVSFs, and scrambling to produce a series of symbols. Channel estimates, derived by the processor 2090 from a reference signal transmitted by the Node B 2010 or from feedback contained in a midamble transmitted by the Node B 2010, may be used to select the appropriate coding, modulation, spreading, and/or scrambling schemes. The symbols produced by the processor 2090 will be utilized to create a frame structure. The processor 2090 creates this frame structure by multiplexing the symbols with additional information, resulting in a series of frames. The frames are then provided to a transmitter 2056, which provides various signal conditioning functions including amplification, filtering, and modulating the frames onto a carrier for uplink transmission over the wireless medium through the one or more antennas 2052.

The uplink transmission is processed at the Node B 2010 in a manner similar to that described in connection with the receiver function at the UE 2050. A receiver 2035 receives the uplink transmission through the one or more antennas 2034 and processes the transmission to recover the information modulated onto the carrier. The information recovered by the receiver 2035 is provided to the processor 2040, which parses each frame. The processor 2040 performs the inverse of the processing performed by the processor 2090 in the UE 2050. The data and control signals carried by the successfully decoded frames may then be provided to a data sink 2039. If some of the frames were unsuccessfully decoded by the receive processor, the controller/processor 2040 may also use an acknowledgement (ACK) and/or negative acknowledgement (NACK) protocol to support retransmission requests for those frames.

The controller/processors 2040 and 2090 may be used to direct the operation at the Node B 2010 and the UE 2050, respectively. For example, the controller/processors 2040 and 2090 may provide various functions including timing, peripheral interfaces, voltage regulation, power management, and other control functions. The computer readable media of memories 2042 and 2092 may store data and software for the Node B 2010 and the UE 2050, respectively.

Conclusion

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, the method comprising:

determining that one or more reference enhanced transport format combination (E-TFC) indicators (E-TFCIs) are outside a valid range of E-TFCIs for high speed uplink packet access (HSUPA);

identifying a lowest reference E-TFCI outside the valid range of E-TFCIs;
determining a gain factor for an E-TFC associated with an E-TFCI inside the valid range of E-TFCIs based in part on the identified lowest reference E-TFCI outside the valid range of E-TFCIs; and
transmitting a signal at a power level that is based on the gain factor.

2. The method of claim 1, wherein determining the gain factor comprises performing an interpolation that uses the identified lowest reference E-TFCI outside the valid range of E-TFCIs and a next-higher reference E-TFCI.

3. The method of claim 1, wherein the gain factor comprises $\beta$ed.

4. The method of claim 1, wherein the gain factor comprises an offset between a transmit power for a control channel and a transmit power for a data channel.

5. An apparatus configured for wireless communication, the apparatus comprising:
a transceiver;
a memory; and
at least one processor communicatively coupled to the transceiver and the memory, wherein the at least one processor is configured to:
determine that one or more reference enhanced transport format combination (E-TFC) indicators (E-TFCIs) are outside a valid range of E-TFCIs for high speed uplink packet access (HSUPA);
identify a lowest reference E-TFCI outside the valid range of E-TFCIs;
determine a gain factor for an E-TFC associated with an E-TFCI inside the valid range of E-TFCIs based in part on the identified lowest reference E-TFCI outside the valid range of E-TFCIs; and
utilize the transceiver to transmit a signal at a power level that is based on the gain factor.

6. The apparatus of claim 5, wherein determining the gain factor comprises performing an interpolation that uses the identified lowest reference E-TFCI outside the valid range of E-TFCIs and a next-higher reference E-TFCI.

7. The apparatus of claim 5, wherein the gain factor comprises $\beta$ed.

8. The apparatus of claim 5, wherein the gain factor comprises an offset between a transmit power for a control channel and a transmit power for a data channel.

9. An apparatus for wireless communication, the apparatus comprising: means for determining that one or more reference enhanced transport format combination (E-TFC) indicators (E-TFCIs) are outside a valid range of E-TFCIs for high speed uplink packet access (HSUPA);
means for identifying a lowest reference E-TFCI outside the valid range of E-TFCIs;
means for determining a gain factor for an E-TFC associated with an E-TFCI inside the valid range of E-TFCIs based in part on the identified lowest reference E-TFCI outside the valid range of E-TFCIs; and
means for transmitting a signal at a power level that is based on the gain factor.

10. The apparatus of claim 9, wherein the means for determining the gain factor is configured to perform an interpolation that uses the identified lowest reference E-TFCI outside the valid range of E-TFCIs and a next-higher reference E-TFCI.

11. The apparatus of claim 9, wherein the gain factor comprises $\beta$ed.

12. The apparatus of claim 9, wherein the gain factor comprises an offset between a transmit power for a control channel and a transmit power for a data channel.

13. A non-transitory computer-readable medium storing computer-executable code comprising instructions configured to:
determine that one or more reference enhanced transport format combination (E-TFC) indicators (E-TFCIs) are outside a valid range of E-TFCIs for high speed uplink packet access (HSUPA);
identify a lowest reference E-TFCI outside the valid range of E-TFCIs;
determine a gain factor for an E-TFC associated with an E-TFCI inside the valid range of E-TFCIs based in part on the identified lowest reference E-TFCI outside the valid range of E-TFCIs; and
transmit a signal at a power level that is based on the gain factor.

14. The non-transitory computer-readable medium of claim 13, wherein determining the gain factor comprises performing an interpolation that uses the identified lowest reference E-TFCI outside the valid range of E-TFCIs and a next-higher reference E-TFCI.

15. The non-transitory computer-readable medium of claim 13, wherein the gain factor comprises $\beta$ed.

* * * * *